(12) United States Patent
Nakamura et al.

(10) Patent No.: US 12,169,284 B2
(45) Date of Patent: Dec. 17, 2024

(54) IMAGE DISPLAY APPARATUS AND SCREEN

(71) Applicant: SONY GROUP CORPORATION, Tokyo (JP)

(72) Inventors: Tomoharu Nakamura, Tokyo (JP); Akira Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 475 days.

(21) Appl. No.: 17/604,578

(22) PCT Filed: Apr. 14, 2020

(86) PCT No.: PCT/JP2020/016375
§ 371 (c)(1),
(2) Date: Oct. 18, 2021

(87) PCT Pub. No.: WO2020/218080
PCT Pub. Date: Oct. 29, 2020

(65) Prior Publication Data
US 2022/0201261 A1    Jun. 23, 2022

(30) Foreign Application Priority Data

Apr. 26, 2019   (JP) .................................. 2019-085053

(51) Int. Cl.
*G02B 27/09*      (2006.01)
*G02B 5/32*       (2006.01)
(Continued)

(52) U.S. Cl.
CPC ........... *G02B 27/0944* (2013.01); *G02B 5/32* (2013.01); *G02B 27/0977* (2013.01);
(Continued)

(58) Field of Classification Search
CPC ...... H04N 9/3152; H04N 9/3141; G02B 5/32; G02B 27/0944; G02B 27/0977;
(Continued)

(56) References Cited

U.S. PATENT DOCUMENTS

2019/0391313 A1    12/2019  Nakamura et al.
2020/0020262 A1*    1/2020  Yano .................... G02B 5/0278
(Continued)

FOREIGN PATENT DOCUMENTS

CN      110383833 A     10/2019
CN      110462489 A     11/2019
(Continued)

OTHER PUBLICATIONS

International Search Report and Written Opinion of PCT Application No. PCT/JP2020/016375, issued on Jun. 23, 2020, 11 pages of ISRWO.

*Primary Examiner* — Magda Cruz
(74) *Attorney, Agent, or Firm* — CHIP LAW GROUP

(57) ABSTRACT

An image display apparatus according to one embodiment of the present disclosure includes: an output section that outputs projection light along a predetermined axis; an irradiated member to be irradiated with the projection light; and a first optical member that is disposed downstream of the irradiated member on a light path of the projection light, and reflects or diffuses a portion of the projection light that has transmitted through the irradiated member.

17 Claims, 19 Drawing Sheets

(51) Int. Cl.
 *G03B 21/62* (2014.01)
 *H04N 9/31* (2006.01)
(52) U.S. Cl.
 CPC .......... *G03B 21/62* (2013.01); *H04N 9/3152* (2013.01); *G02B 27/0916* (2013.01)
(58) Field of Classification Search
 CPC .. G02B 27/0916; G02B 5/001; G02B 5/0252; G02B 5/0278; G02B 5/0284; G02B 19/0028; G02B 19/0047; G03B 21/00; G03B 21/28; G03B 21/62; G09F 19/18
 See application file for complete search history.

(56) References Cited

U.S. PATENT DOCUMENTS

| | | | | |
|---|---|---|---|---|
| 2020/0301135 | A1* | 9/2020 | Yano | H04N 13/363 |
| 2021/0116798 | A1* | 4/2021 | Nakamura | G02B 30/35 |
| 2021/0263328 | A1* | 8/2021 | Nakamura | G03B 21/62 |
| 2021/0356739 | A1* | 11/2021 | Yano | H04N 13/363 |

FOREIGN PATENT DOCUMENTS

| | | | |
|---|---|---|---|
| JP | 2001-264884 | A | 9/2001 |
| JP | 2002-014423 | A | 1/2002 |
| JP | 2018-163307 | A | 10/2018 |
| WO | 2018/163945 | A1 | 9/2018 |

* cited by examiner

[ FIG. 1 ]
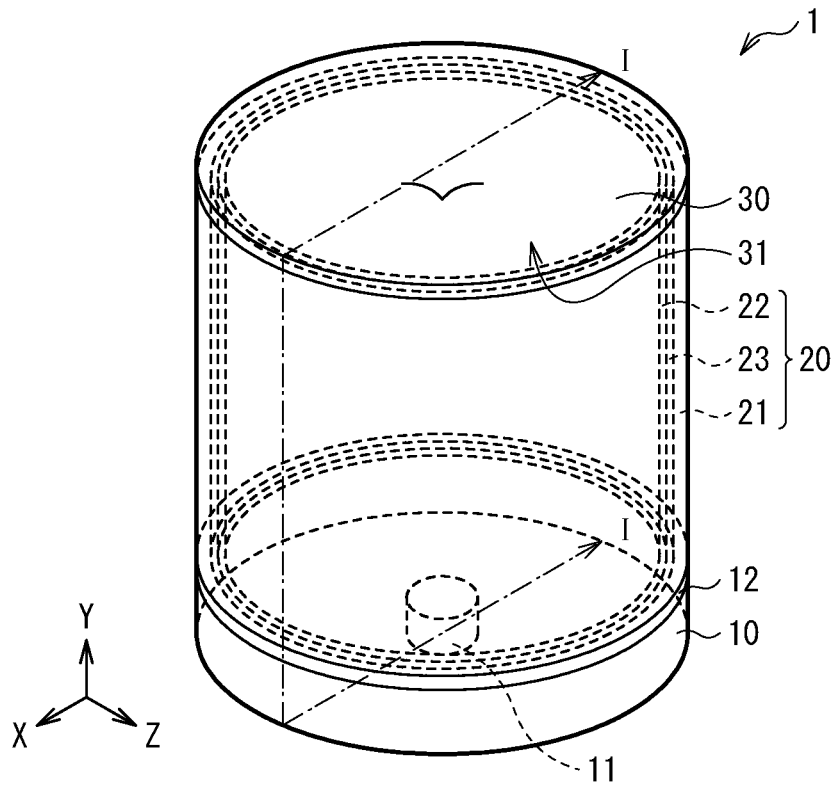
[ FIG. 2 ]
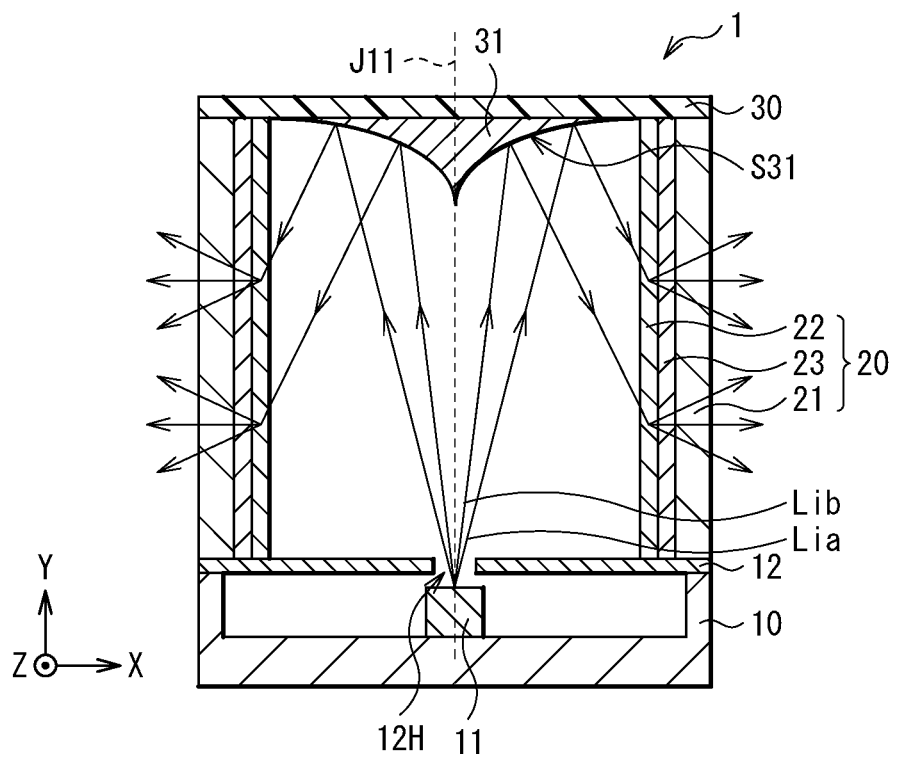

[ FIG. 3 ]
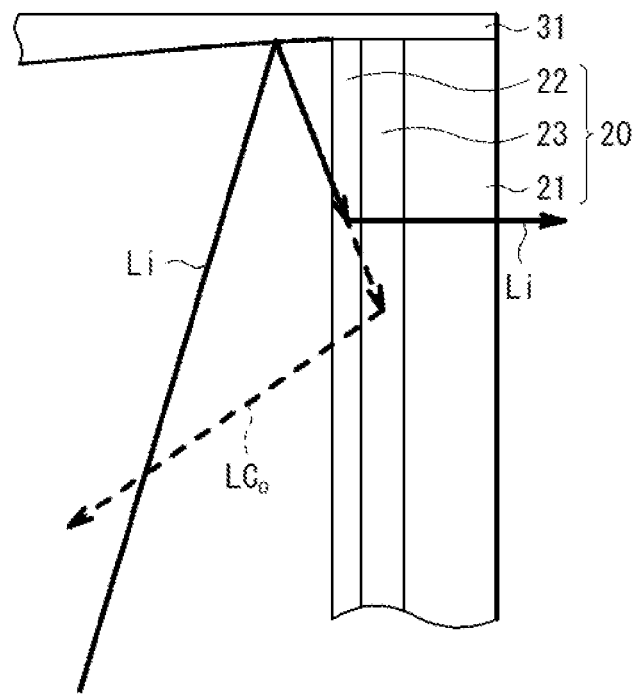
[ FIG. 4 ]
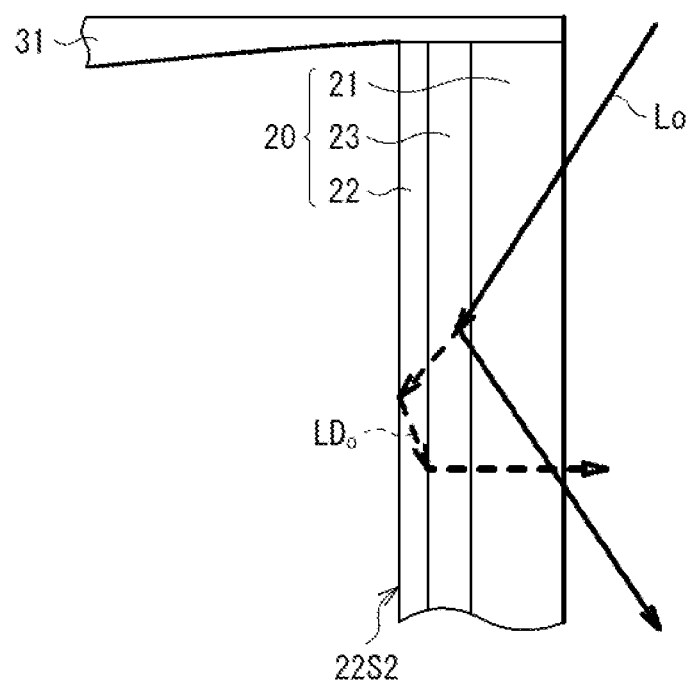

[ FIG. 5A ]
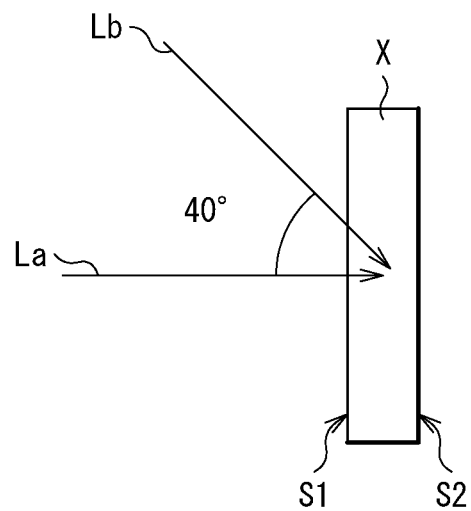
[ FIG. 5B ]
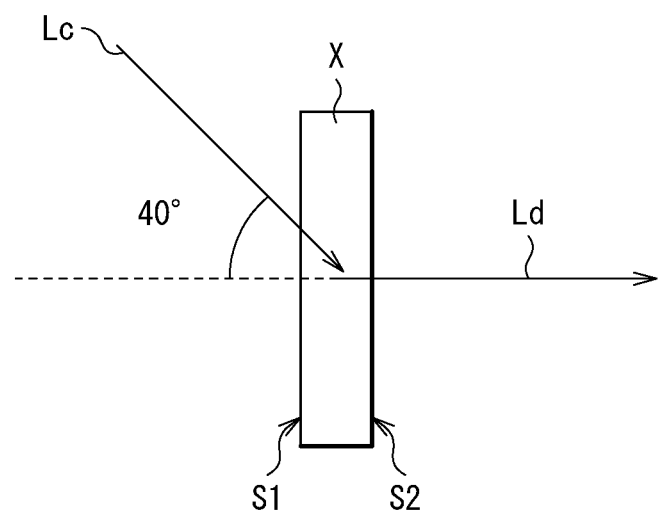

[ FIG. 6 ]
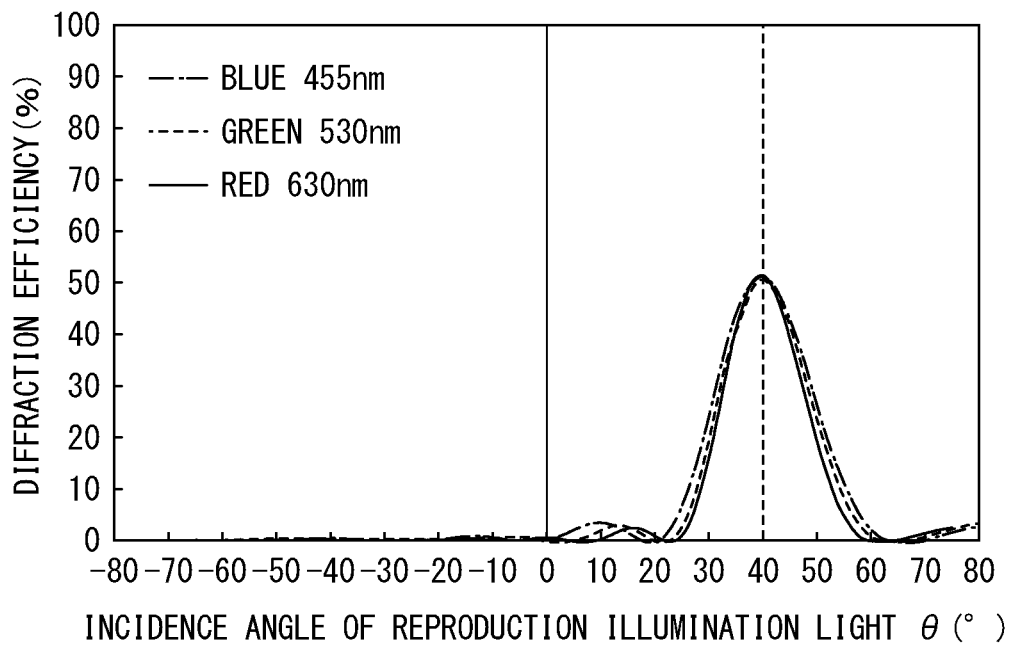
[ FIG. 7A ]
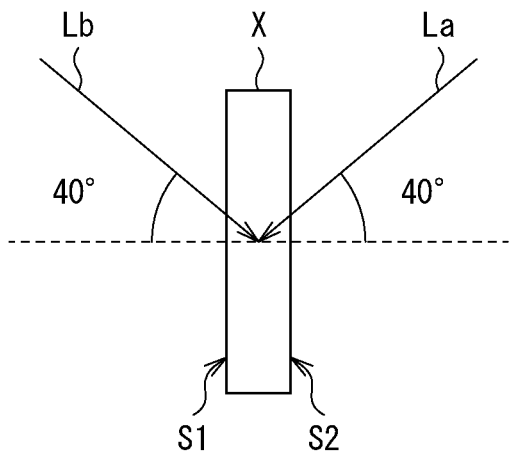

[ FIG. 7B ]
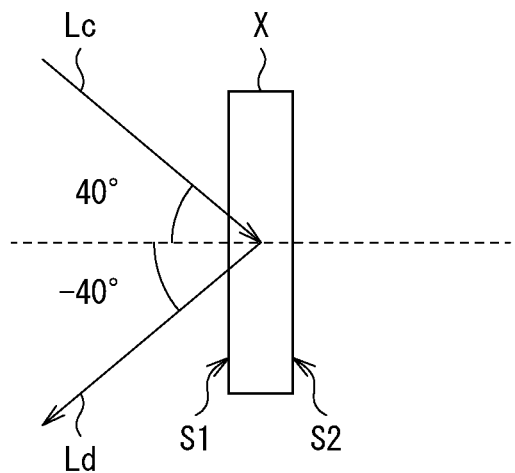
[ FIG. 8 ]
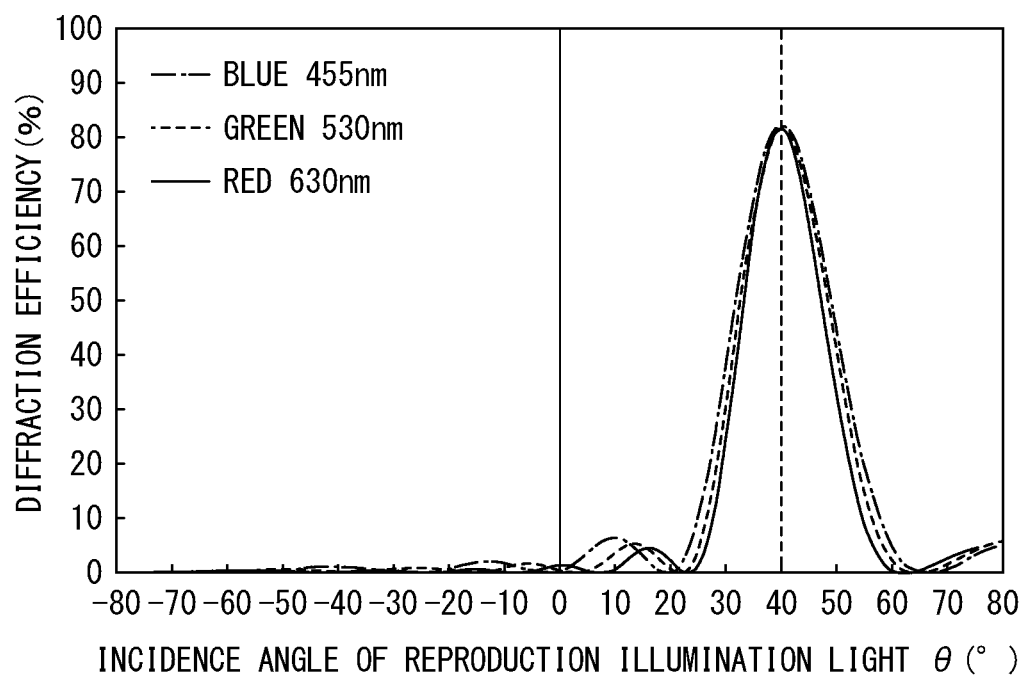

[FIG. 9]
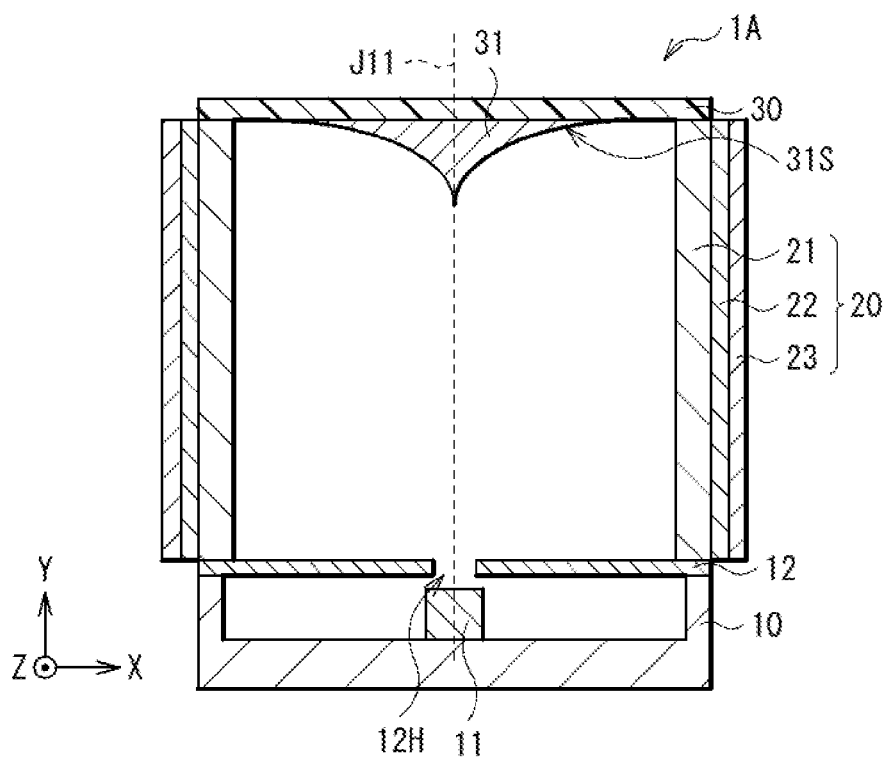
[FIG. 10]
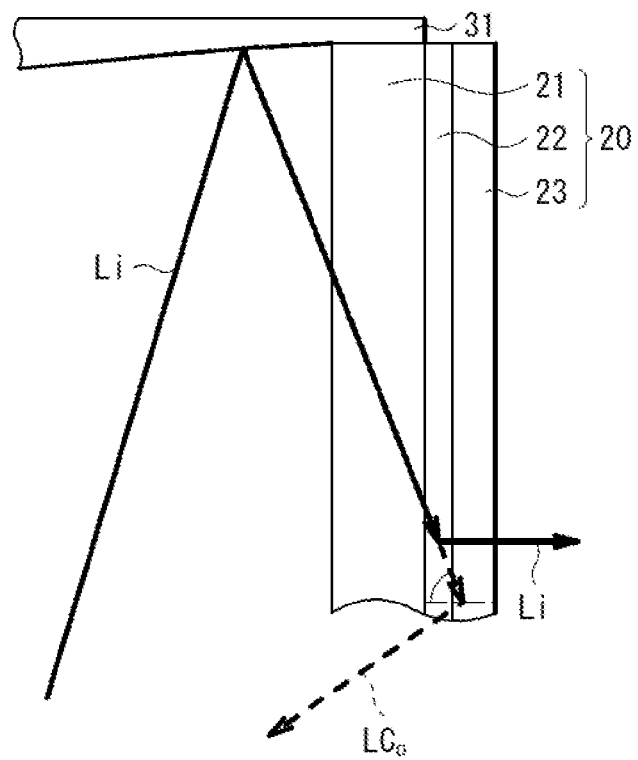

[ FIG. 11 ]
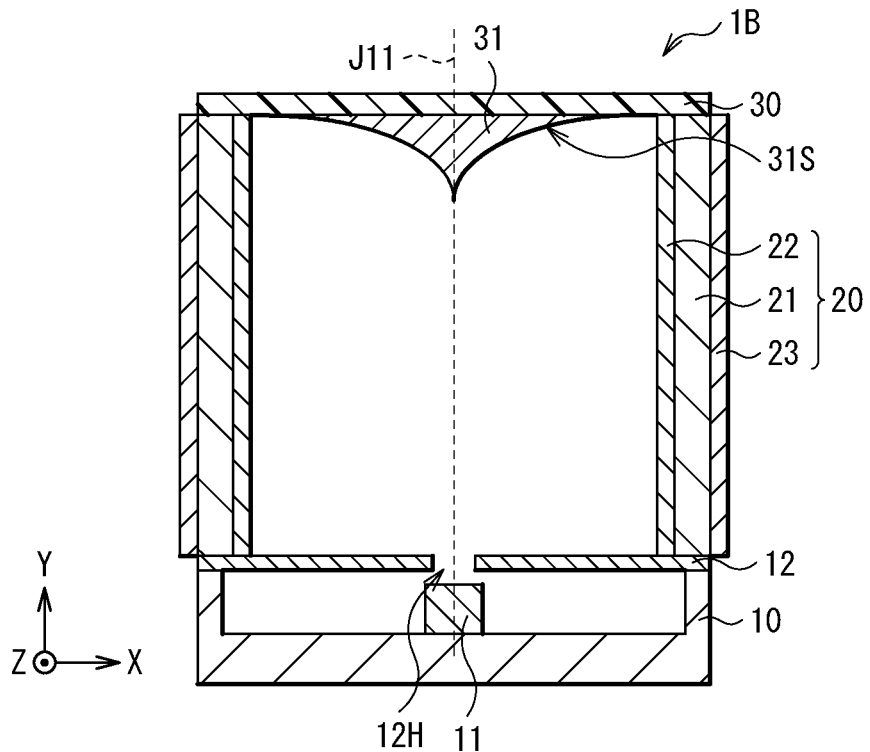
[ FIG. 12 ]
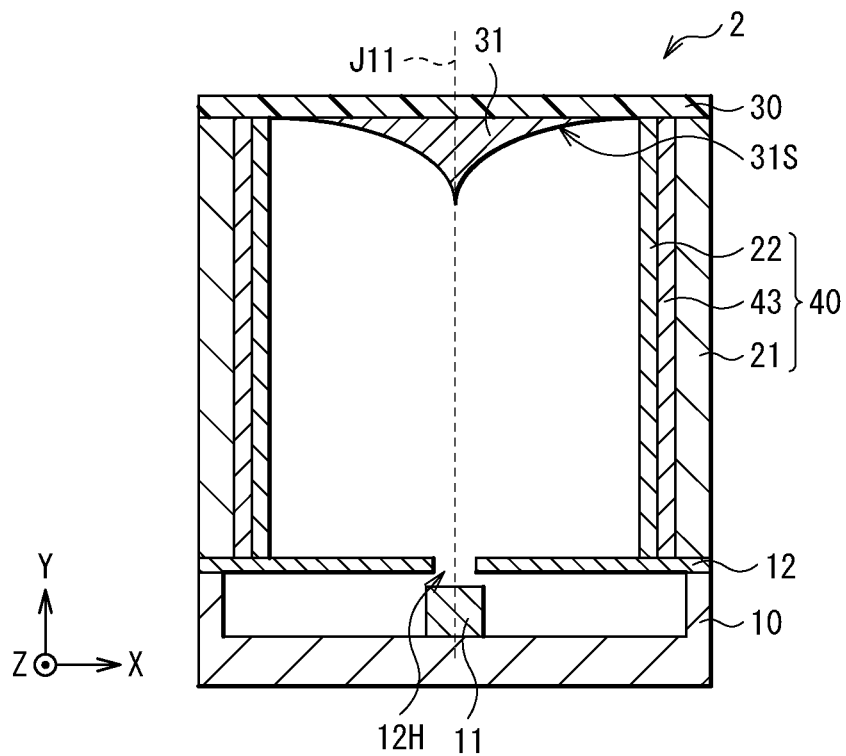

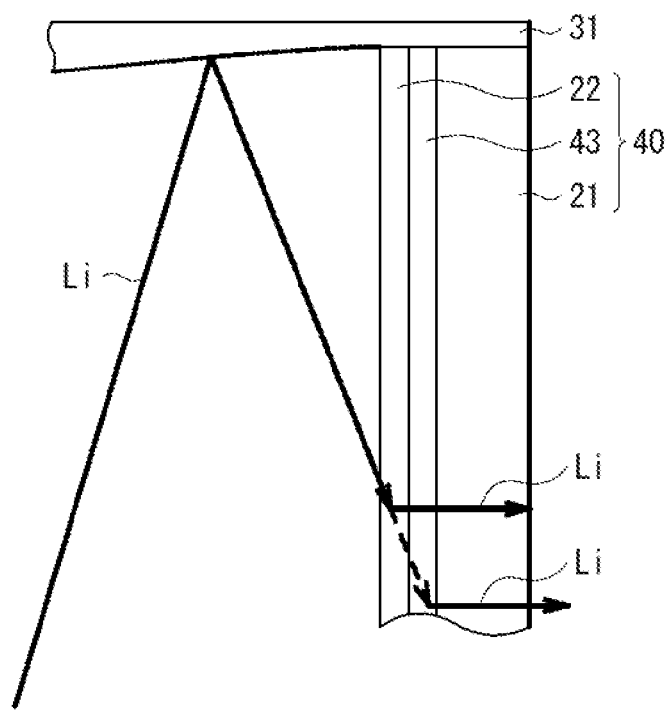

[ FIG. 14 ]
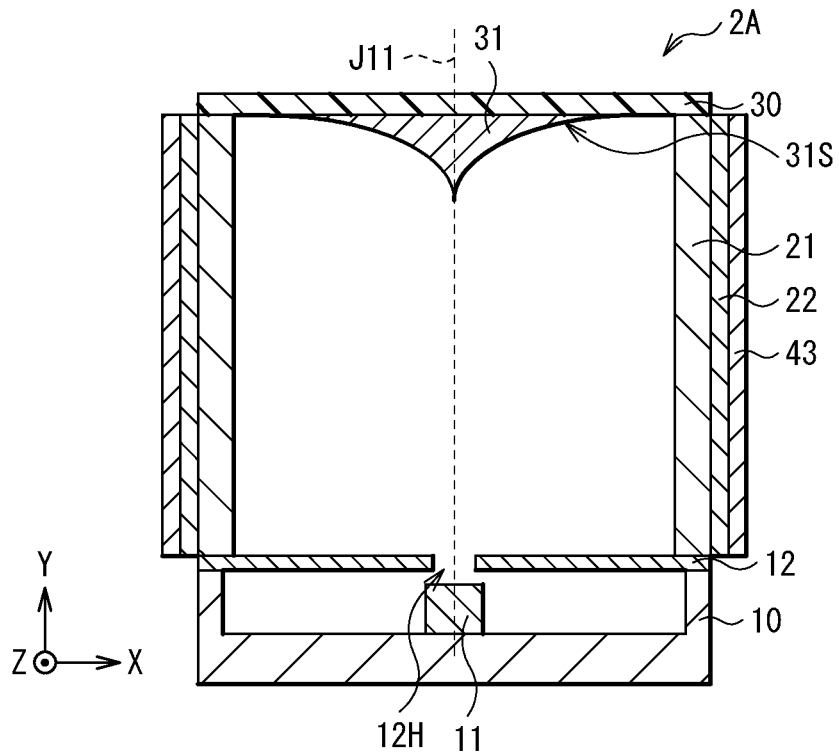
[ FIG. 15 ]
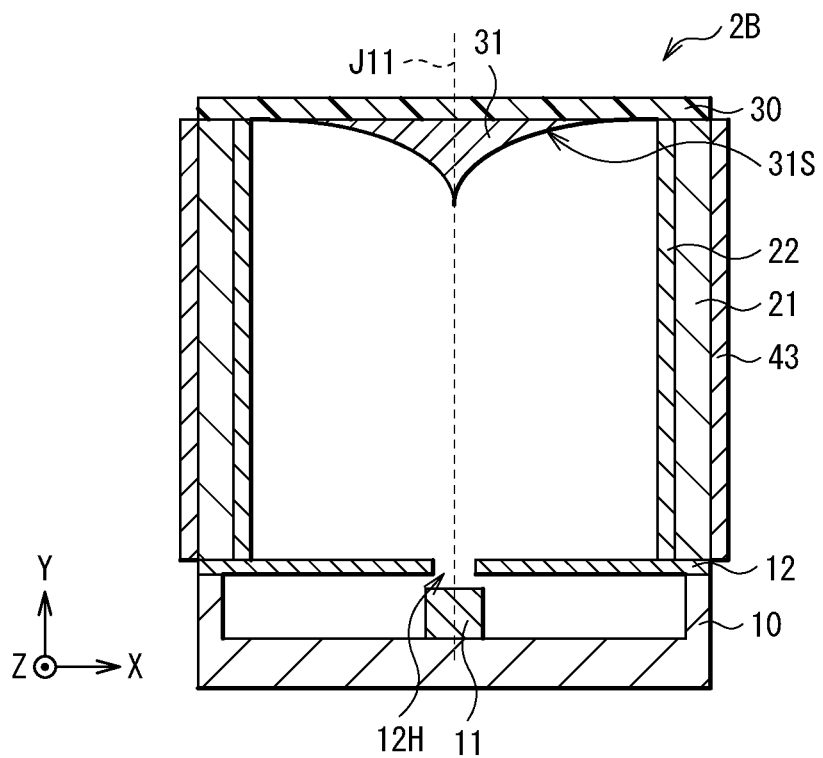

[ FIG. 16 ]
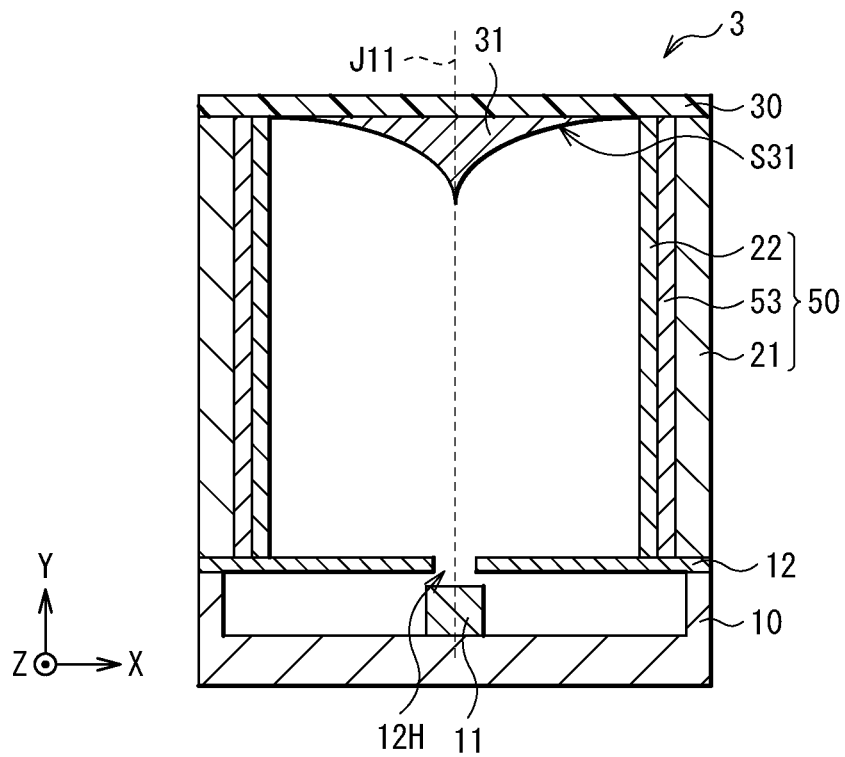
[ FIG. 17A ]
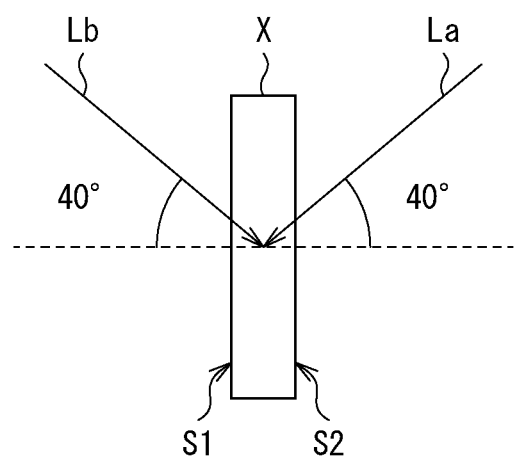

[ FIG. 17B ]
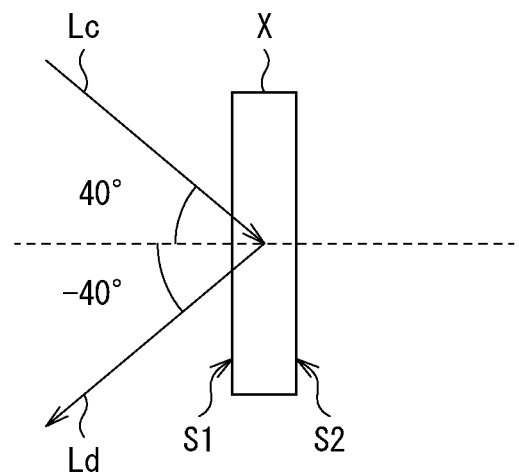
[ FIG. 18 ]
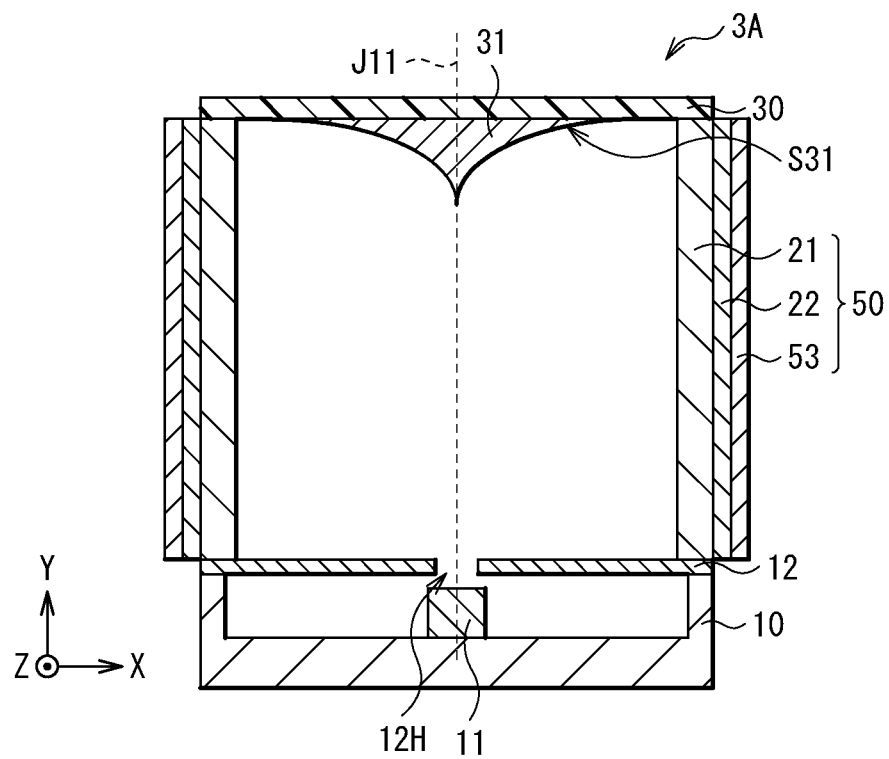

[ FIG. 19 ]
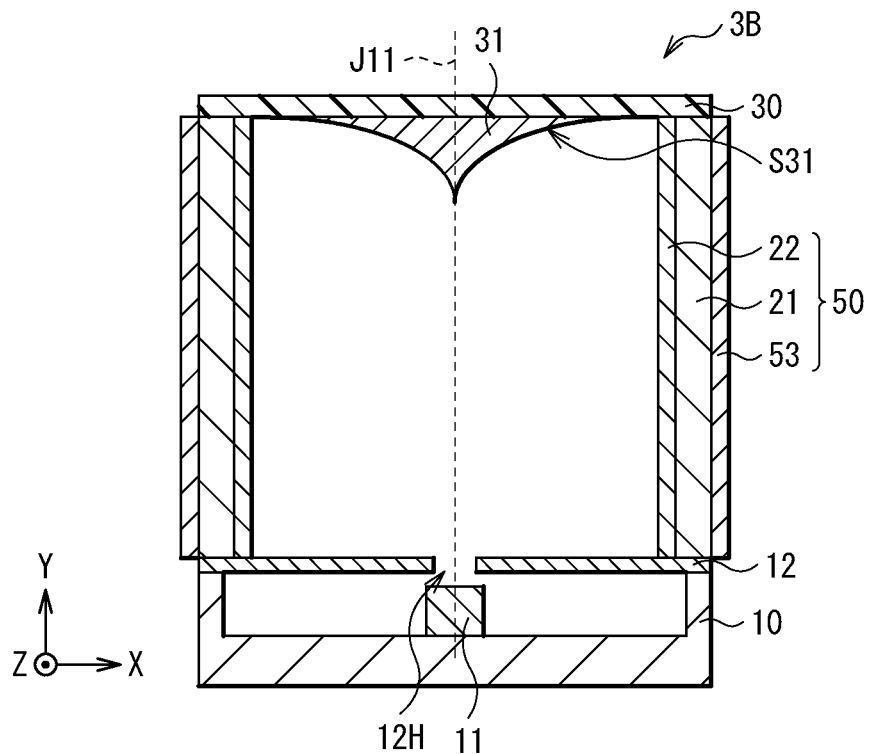
[ FIG. 20 ]
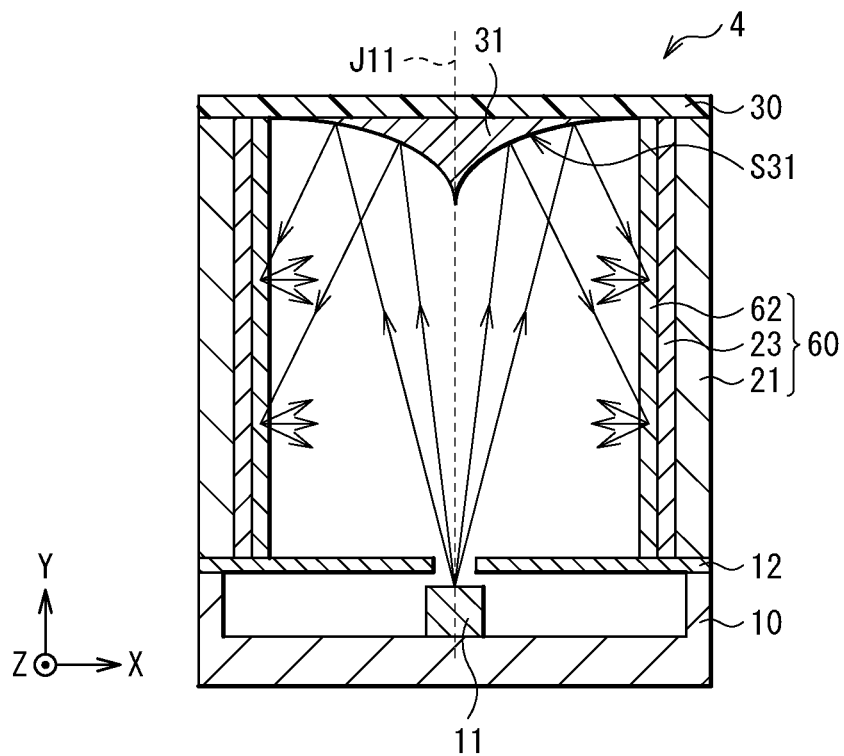

[ FIG. 21 ]
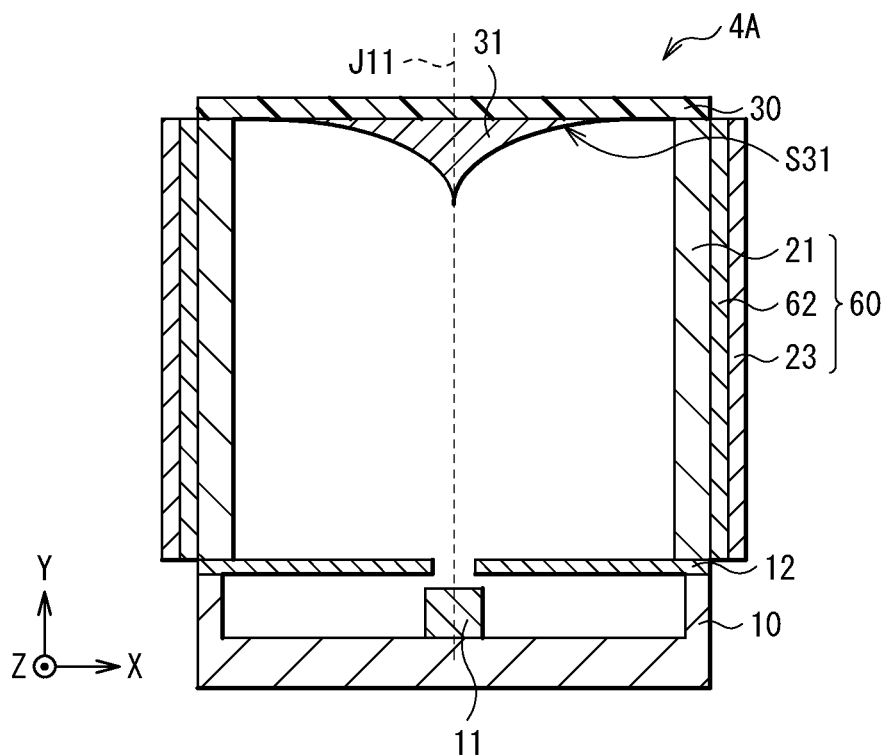
[ FIG. 22 ]
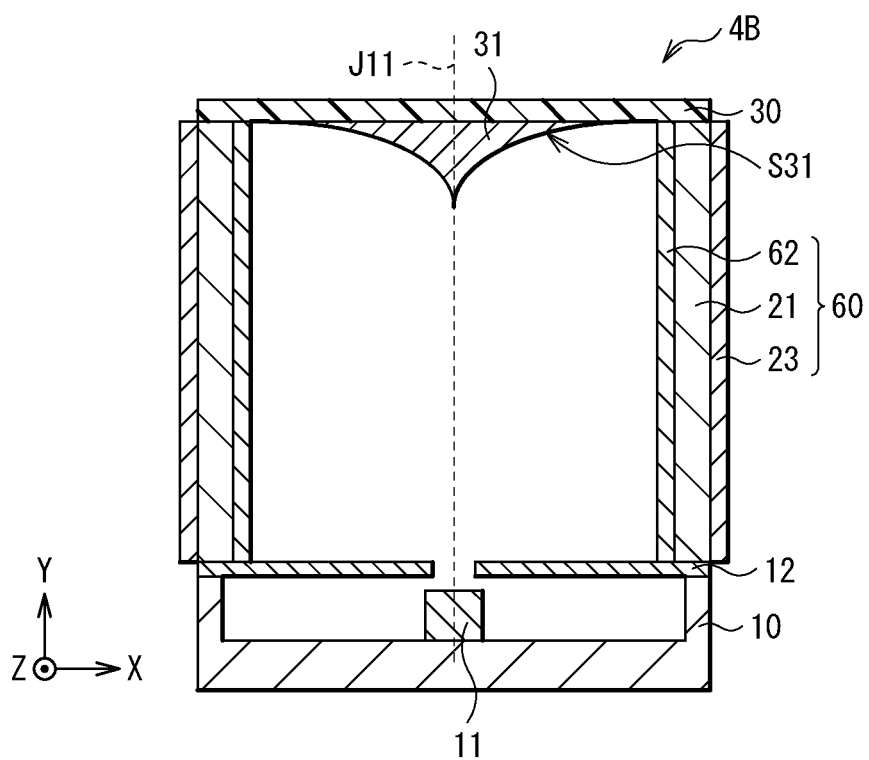

[ FIG. 23 ]
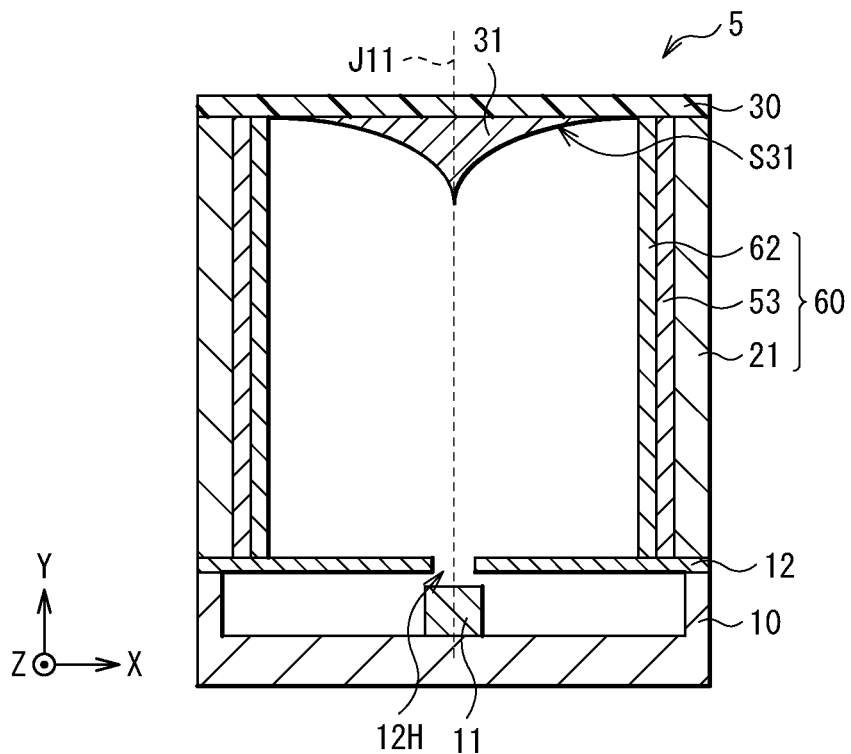
[ FIG. 24 ]
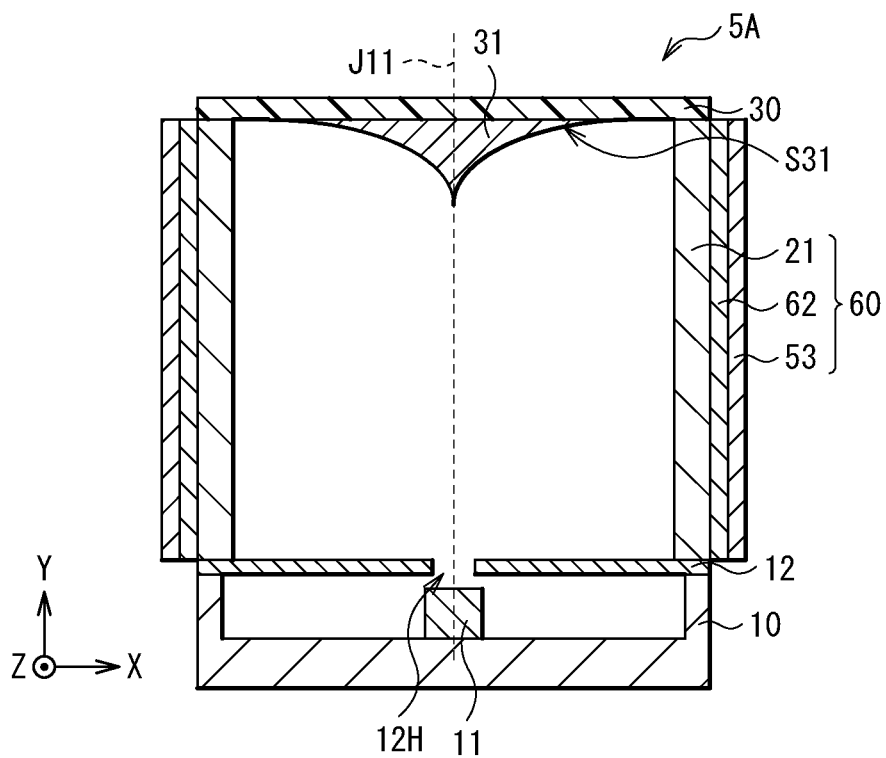

[ FIG. 25 ]
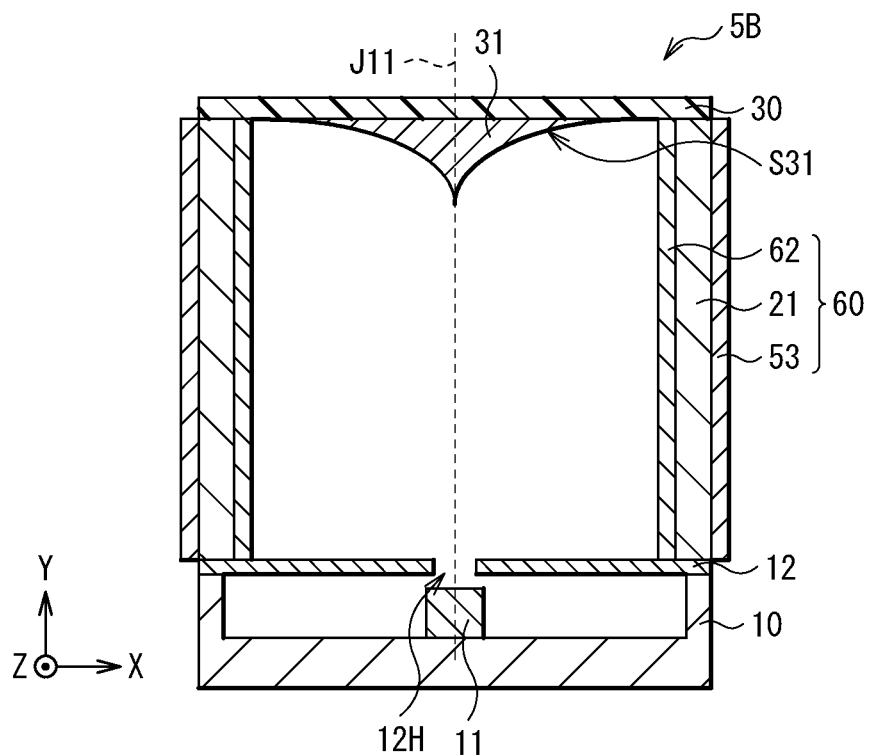
[ FIG. 26 ]
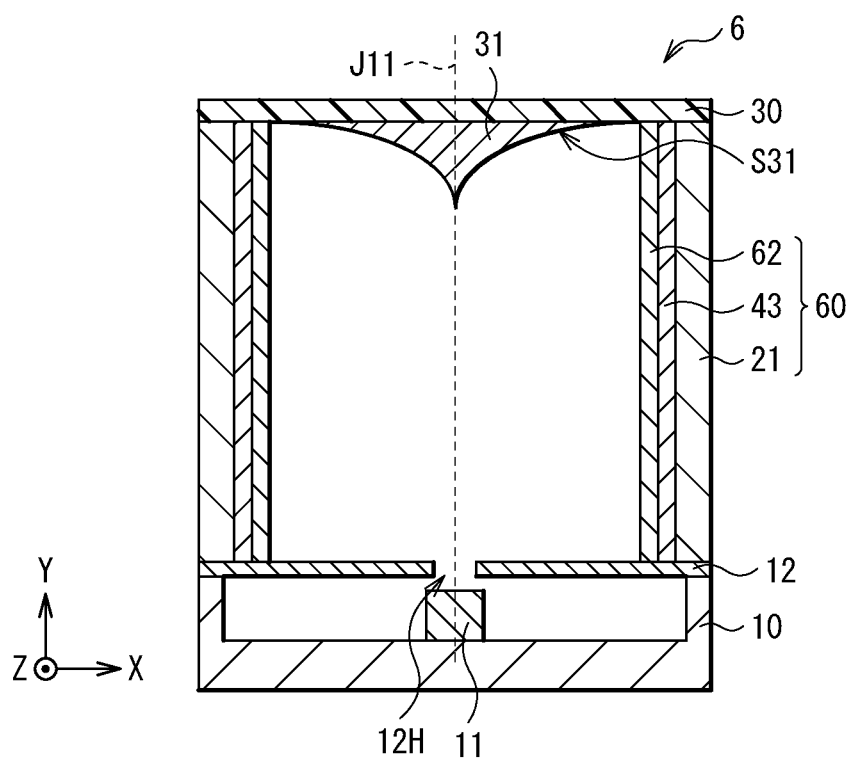

[ FIG. 27 ]
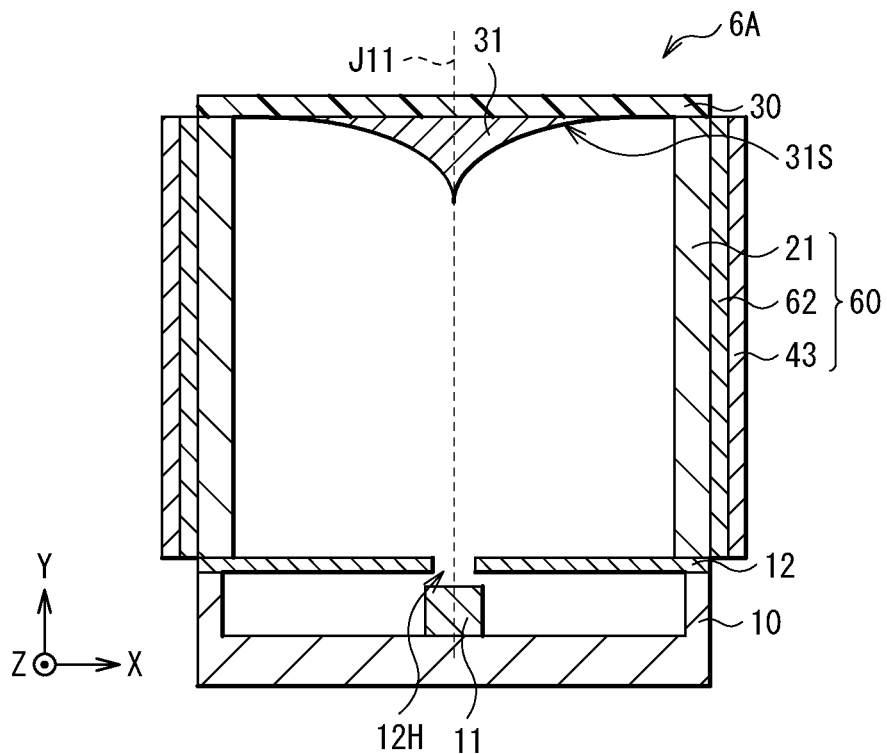
[ FIG. 28 ]
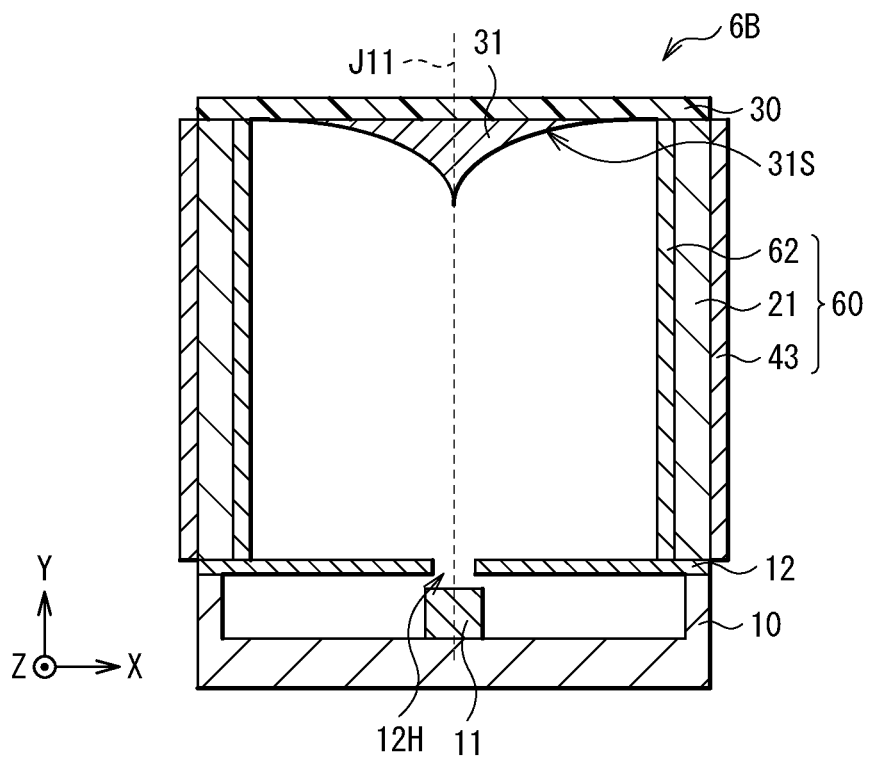

[ FIG. 29 ]
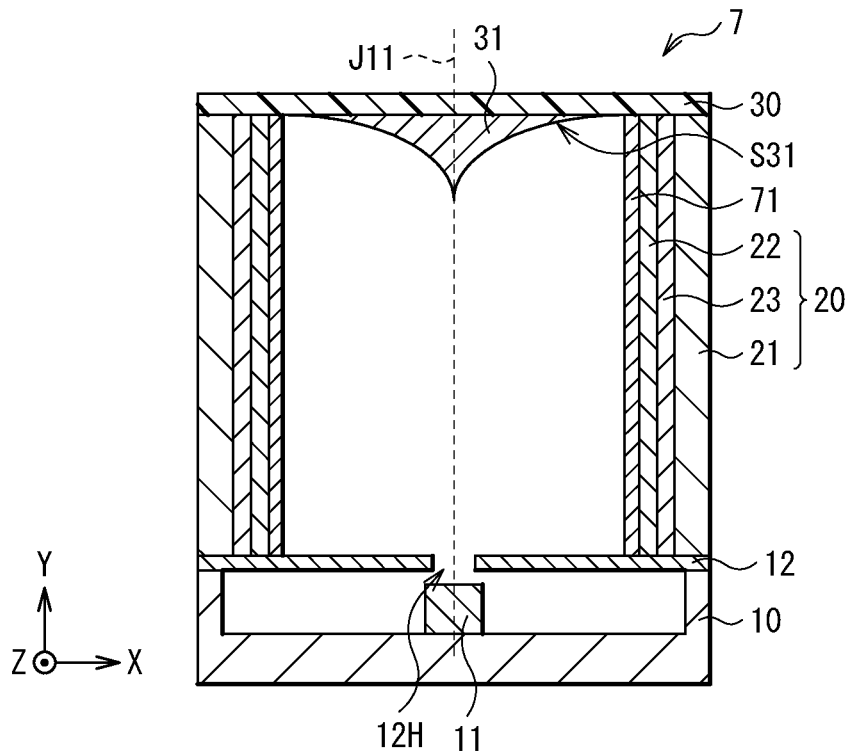
[ FIG. 30 ]
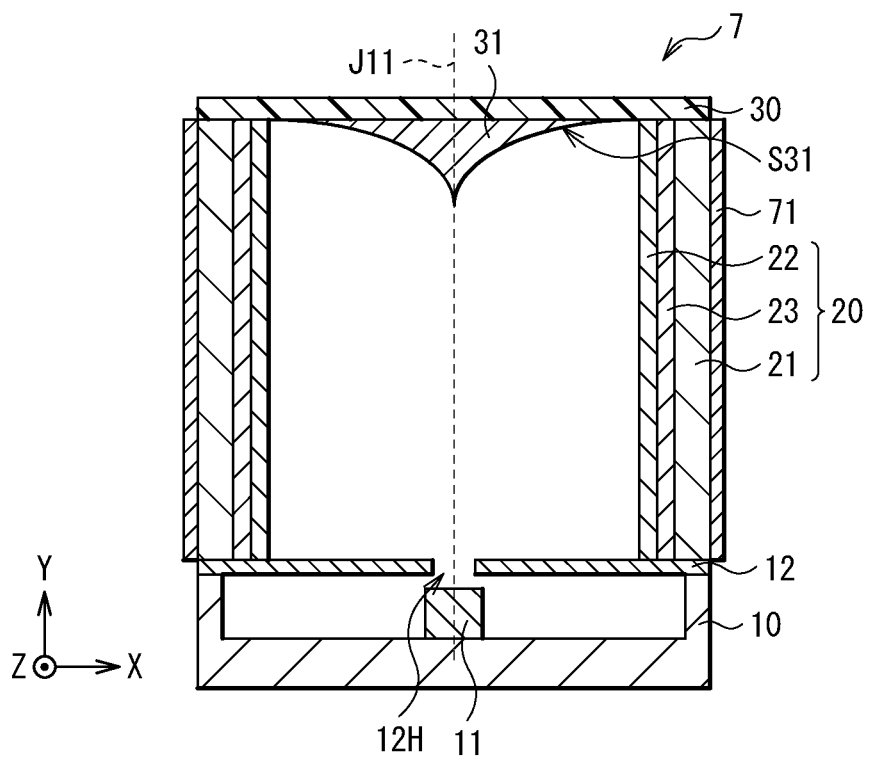

[ FIG. 31 ]
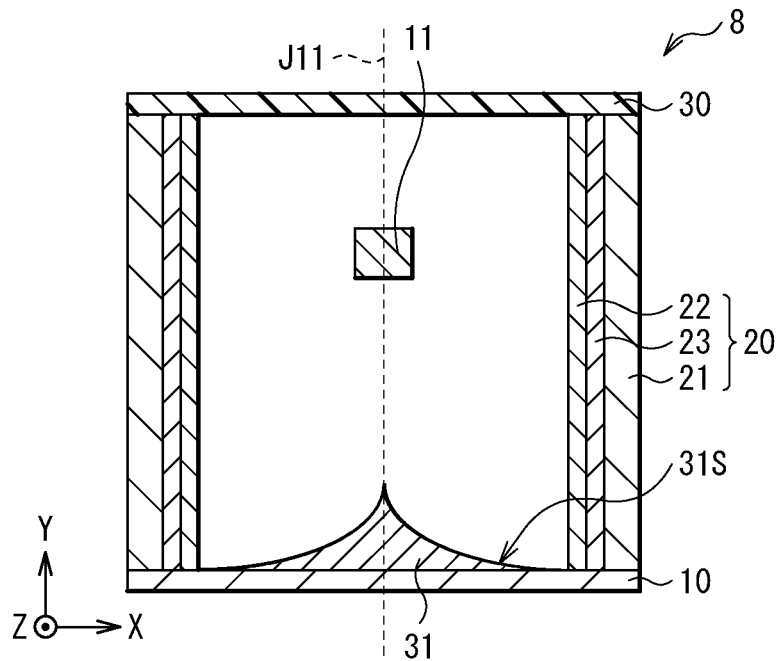
[ FIG. 32 ]
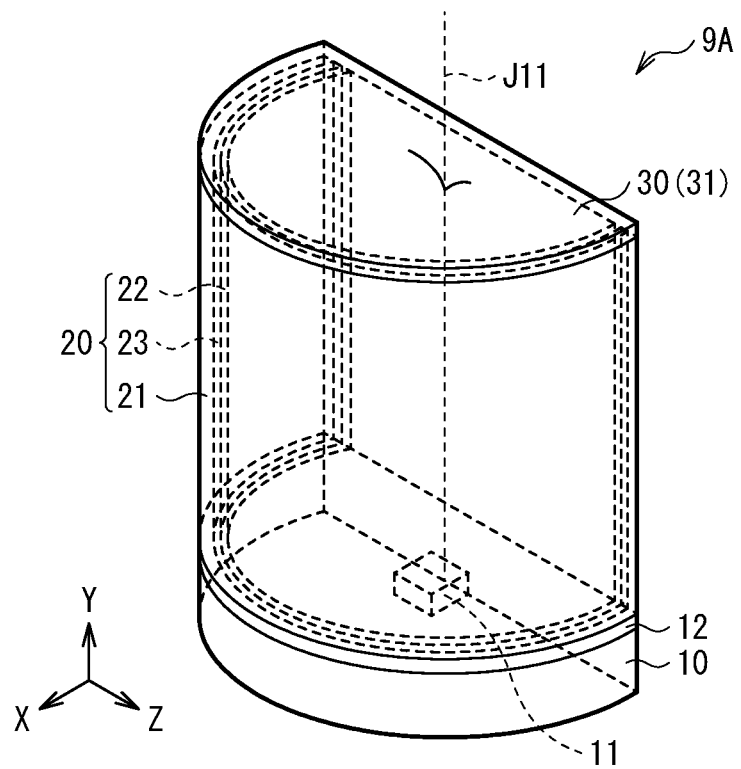

[ FIG. 33 ]
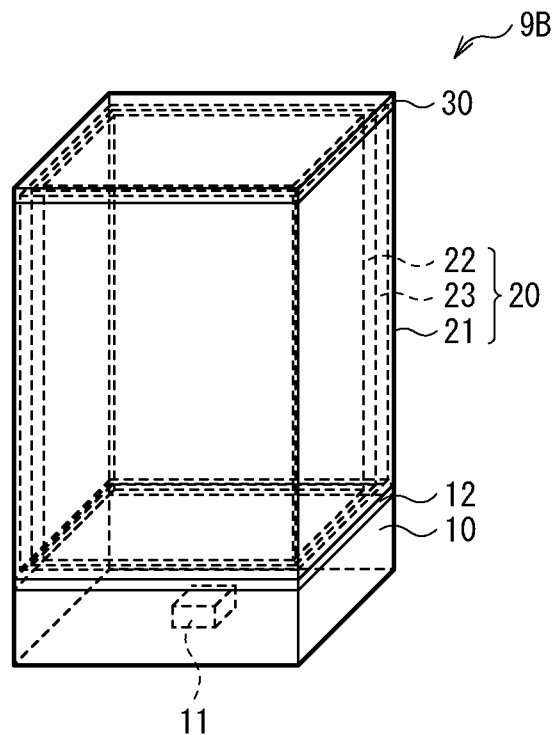
[ FIG. 34 ]
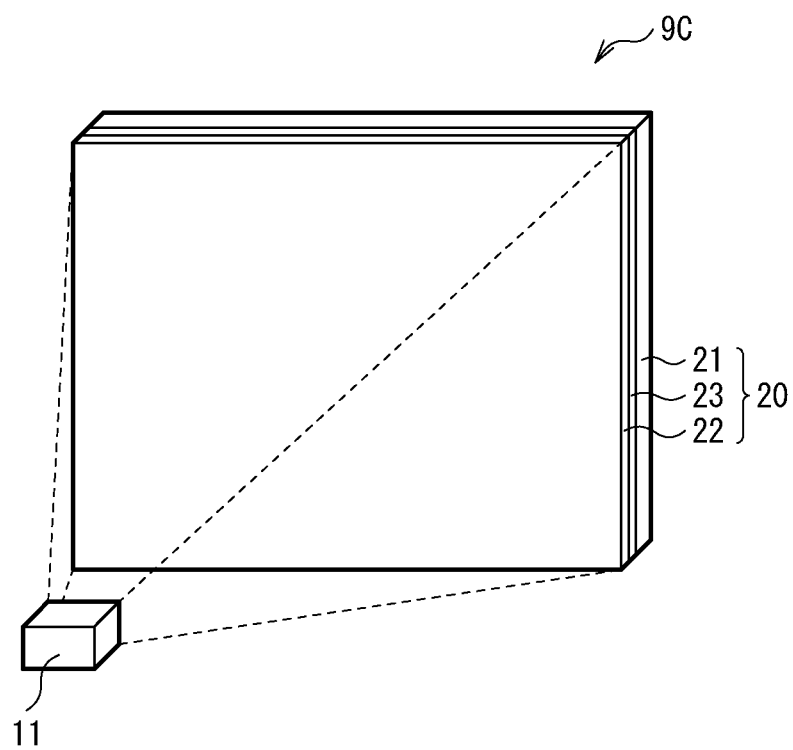

IMAGE DISPLAY APPARATUS AND SCREEN

CROSS REFERENCE TO RELATED APPLICATIONS

This application is a U.S. National Phase of International Patent Application No. PCT/JP2020/016375 filed on Apr. 14, 2020, which claims priority benefit of Japanese Patent Application No. JP 2019-085053 filed in the Japan Patent Office on Apr. 26, 2019. Each of the above-referenced applications is hereby incorporated herein by reference in its entirety.

TECHNICAL FIELD

The present disclosure relates to an image display apparatus that displays an image on a screen, for example, and relates to the screen.

BACKGROUND ART

In recent years, a technique that projects an image onto a screen or the like having various shapes has been developed. For example, Patent Literature 1 discloses an image display apparatus that displays an image onto an all-around screen or the like, by opposing arrangement, with respect to an output section, of an optical section that controls an incidence angle with respect to an irradiation target object of image light outputted from the output section.

CITATION LIST

Patent Literature

Patent Literature 1: International Publication No. 2018/163945

SUMMARY OF THE INVENTION

Incidentally, in an image display apparatus as described above, it is demanded to reduce a noise that causes a decrease in merchantability.

It is desirable to provide an image display apparatus and a screen that make it possible to reduce a noise.

An image display apparatus according to one embodiment of the present disclosure includes: an output section that outputs projection light along a predetermined axis; an irradiated member to be irradiated with the projection light; and a first optical member that is disposed downstream of the irradiated member on a light path of the projection light, and reflects or diffuses a portion of the projection light that has transmitted through the irradiated member.

A screen according to one embodiment of the present disclosure includes: an irradiated member to be irradiated with projection light; and a first optical member that is disposed downstream of the irradiated member on a light path of the projection light, and reflects or diffuses a portion of the projection light that has transmitted through the irradiated member.

In the image display apparatus according to one embodiment of the present disclosure and the screen according to one embodiment of the present disclosure, a leakage light (e.g., 0-order light) amount is reduced by disposing, downstream of the irradiated member and on the light path of the projection light, the first optical member that reflects or diffuses a portion of the projection light that has transmitted through the irradiated member.

BRIEF DESCRIPTION OF THE DRAWINGS

FIG. 1 is a perspective diagram illustrating one example of a configuration of an image display apparatus according to a first embodiment of the present disclosure.

FIG. 2 is a schematic cross-sectional diagram illustrating the image display apparatus illustrated in FIG. 1.

FIG. 3 is a diagram for explaining a light path of image light in the image display apparatus illustrated in FIG. 1.

FIG. 4 is a diagram for explaining a light path of external light in the image display apparatus illustrated in FIG. 1.

FIG. 5A is a diagram for explaining a manufacturing process (upon exposure) of an optical member illustrated in FIG. 1.

FIG. 5B is a diagram for explaining a manufacturing process (upon reproduction) of the optical member illustrated in FIG. 1.

FIG. 6 is a diagram illustrating diffraction characteristics of an irradiated member (a transmission-type diffusion HOE) illustrated in FIG. 1.

FIG. 7A is a diagram for explaining a manufacturing process (upon exposure) of the optical member illustrated in FIG. 1.

FIG. 7B is a diagram for explaining a manufacturing process (upon reproduction) of the optical member illustrated in FIG. 1.

FIG. 8 is a diagram illustrating diffraction characteristics of the optical member (a reflection-type mirror HOE) illustrated in FIG. 1.

FIG. 9 is a schematic cross-sectional diagram illustrating another example of the configuration of the image display apparatus according to the first embodiment of the present disclosure.

FIG. 10 is a diagram illustrating the light path of the image light in the image display apparatus illustrated in FIG. 9.

FIG. 11 is a schematic cross-sectional diagram illustrating another example of the configuration of the image display apparatus according to the first embodiment of the present disclosure.

FIG. 12 is a schematic cross-sectional diagram illustrating one example of a configuration of an image display apparatus according to a second embodiment of the present disclosure.

FIG. 13 is a diagram for explaining a light path of image light in the image display apparatus illustrated in FIG. 12.

FIG. 14 is a schematic cross-sectional diagram illustrating another example of the configuration of the image display apparatus according to the second embodiment of the present disclosure.

FIG. 15 is a schematic cross-sectional diagram illustrating another example of the configuration of the image display apparatus according to the second embodiment of the present disclosure.

FIG. 16 is a schematic cross-sectional diagram illustrating one example of a configuration of an image display apparatus according to a third embodiment of the present disclosure.

FIG. 17A is a diagram for explaining a manufacturing process (upon exposure) of the optical member illustrated in FIG. 16.

FIG. 17B is a diagram for explaining a manufacturing process (upon reproduction) of the optical member illustrated in FIG. 16.

FIG. 18 is a schematic cross-sectional diagram illustrating another example of the configuration of the image display apparatus according to the third embodiment of the present disclosure.

FIG. 19 is a schematic cross-sectional diagram illustrating another example of the configuration of the image display apparatus according to the third embodiment of the present disclosure.

FIG. 20 is a schematic cross-sectional diagram illustrating one example of a configuration of an image display apparatus according to a fourth embodiment of the present disclosure.

FIG. 21 is a schematic cross-sectional diagram illustrating another example of the configuration of the image display apparatus according to the fourth embodiment of the present disclosure.

FIG. 22 is a schematic cross-sectional diagram illustrating another example of the configuration of the image display apparatus according to the fourth embodiment of the present disclosure.

FIG. 23 is a schematic cross-sectional diagram illustrating another example of the configuration of the image display apparatus according to the fourth embodiment of the present disclosure.

FIG. 24 is a schematic cross-sectional diagram illustrating another example of the configuration of the image display apparatus according to the fourth embodiment of the present disclosure.

FIG. 25 is a schematic cross-sectional diagram illustrating another example of the configuration of the image display apparatus according to the fourth embodiment of the present disclosure.

FIG. 26 is a schematic cross-sectional diagram illustrating another example of the configuration of the image display apparatus according to the fourth embodiment of the present disclosure.

FIG. 27 is a schematic cross-sectional diagram illustrating another example of the configuration of the image display apparatus according to the fourth embodiment of the present disclosure.

FIG. 28 is a schematic cross-sectional diagram illustrating another example of the configuration of the image display apparatus according to the fourth embodiment of the present disclosure.

FIG. 29 is a schematic cross-sectional diagram illustrating one example of a configuration of an image display apparatus according to modification example 2 of the present disclosure.

FIG. 30 is a schematic cross-sectional diagram illustrating another example of the configuration of the image display apparatus according to the modification example 2 of the present disclosure.

FIG. 31 is a schematic cross-sectional diagram illustrating one example of a configuration of an image display apparatus according to modification example 3 of the present disclosure.

FIG. 32 is a perspective diagram illustrating one example of a configuration of an image display apparatus according to modification example 4 of the present disclosure.

FIG. 33 is a perspective diagram illustrating another example of the configuration of the image display apparatus according to the modification example 4 of the present disclosure.

FIG. 34 is a perspective diagram illustrating another example of the configuration of the image display apparatus according to the modification example 4 of the present disclosure.

MODES FOR CARRYING OUT THE INVENTION

Hereinafter, embodiments of the present disclosure will be described in detail with reference to the drawings. The following description is one concrete example of the present disclosure, and the present disclosure is not limited to the following embodiments. In addition, the present disclosure is not limited to arrangement, dimensions, dimensional ratios, and the like of the constituent elements illustrated in the respective drawings. It is to be noted that the description is given in the following order.

1. First Embodiment (an examples in which a screen is configured using a transmission-type diffusion HOE and a reflection-type mirror HOE as an irradiated member and an optical member, respectively)
    1-1. Configuration of Image Display Apparatus
    1-2. Operation of Image Display Apparatus
    1-3. Workings and Effects
2. Second Embodiment (an example in which the screen is configured using a transmission-type diffusion HOE as the optical member)
3. Third Embodiment (an example in which the screen is configured using a reflection-type diffusion HOE as the optical member)
4. Fourth Embodiment (an example in which the screen is configured using the reflection-type diffusion HOE as the irradiated member)
5. Modification Examples
    5-1. Modification Example 1 (another example of a shape of a reflection mirror)
    5-2. Modification Example 2 (an example in which a reflection reducing film is further used)
    5-3. Modification Example 3 (an example in which the reflection mirror is disposed below)
    5-4. Modification Example 4 (an example of an image display apparatus having another shape)

1. First Embodiment

FIG. 1 is a perspective diagram illustrating a configuration of an image display apparatus (an image display apparatus 1) according to a first embodiment of the present disclosure. FIG. 2 schematically illustrates a cross-sectional configuration of the image display apparatus 1 taken along the line I-I illustrated in FIG. 1. The image display apparatus 1 is able to display a picture on an all-around screen having a rotary body shape, for example.

1-1. Configuration of Image Display Apparatus

The image display apparatus 1 has a cylindrical shape, and is configured by a base 10, a screen 20, and a top plate 30. The base 10 is provided with an output section 11 that outputs image light Li along a predetermined axis (e.g., an axis J11). The screen 20 is disposed around, for example, the entire circumference of the axis J11. A reflection mirror 31, for example, is provided on the top plate 30, and the reflection mirror 31 is disposed facing the output section 11 with respect to the axis J11 as a reference. In the present embodiment, the screen 20 includes, for example, a supporting member 21, an irradiated member 22, and an optical member 23. This is for reducing transmittance through the screen 20 of a portion of image light Li having transmitted through the irradiated member 22 (for example, 0-order light $Li_0$ of the image light Li having transmitted through the irradiated member 22) and is disposed downstream of the irradiated member 22 on a light path of the image light Li outputted from the output section 11.

The base 10 is for holding the output section 11, the screen 20, and the top plate 30, and is disposed, for example, below the image display apparatus 1. The output section 11, the screen 20, and the top plate 30 are held by any holding mechanism which is not illustrated. For example, a partition plate 12 is provided between the base 10 and the screen 20. Although not illustrated, the base 10 further is provided, on an as-necessary basis, a power supply source such as a battery, a speaker, any other device used for operations of the image display apparatus 1, and the like. A shape of the base 10 and the like are not limited. For example, although the base 10 of a cylindrical shape is illustrated in FIG. 1, it is possible to select any shape such as a rectangular parallelepiped as with an image display apparatus 9A or 9B described later (see FIGS. 31 and 32).

As described above, the output section 11 radially outputs the image light Li that constitutes an image including a moving image and a still image. The output section 11 is, for example, disposed upward at a position substantially in the center of the base 10. As a result, the image light Li is outputted radially along the predetermined axis (the axis J11) extending in a Y-axis direction.

As the output section 11, for example, a laser-scanning type color projector or the like is used that performs scanning of pieces of laser light corresponding to respective colors of R, G, and B and displays each pixel. Besides, it is possible to use any projector capable of projecting the image light Li as the output section 11. For example, it is possible to use a small-sized mobile projector (a pico-projector), a projector using a single color laser light, or the like as appropriate in accordance with a size, an application, or the like of the image display apparatus 1.

As a light source of the output section 11, for example, it is possible to use a solid-state light source such as a semiconductor laser (LD) or a light emitting diode (LED), for example, a halogen lamp, a metal halide lamp, a xenon lamp, or the like. The output section 11 may also be, for example, a projector having a light modulator such as a transmissive liquid crystal or a reflective liquid crystal called LCOS (Liquid crystal on silicon), a projector having DMD (Digital Micromirror Device), a projector having MEMS (Micro Electro Mechanical System), or the like. It is possible to use the light source and the projector in combination as appropriate. Note that a projector having a configuration other than the above may be used.

The partition plate 12 is, for example, for partitioning internal space inside the base 10 in which the output section 11 is disposed from internal space of the screen 20. The partition plate 12 has an opening 12H at a position facing the output section 11 so as not to interfere with application of the image light Li outputted from the output section 11 to the reflection mirror 31. As the partition plate 12, for example, it is preferable to use a member having a reflectivity of 50% or less. This reduces a projection intensity of a picture on the partition plate 12 when, for example, the image light Li is reflected inside the screen 20.

As described above, the screen 20 has a cylindrical shape and is disposed around the axis J11, for example, over the entire circumference, and is configured by, for example, the supporting member 21, the irradiated member 22, and the optical member 23. Further, the screen 20 having the cylindrical shape is disposed such that its central axis is substantially positioned with respect to the axis J11 of the output section 11. Note that, in FIG. 1, an example is illustrated in which the screen 20 has a diameter similar to that of the base 10, but it is not limited thereto. It is possible to appropriately set the diameter and a height of the screen 20.

The supporting member 21 is for supporting the irradiated member 22 and the optical member 23, and it is possible to use, for example, a base member having light permeability. Such a base member includes, for example, a plastic material such as an acrylic resin or a polycarbonate resin, glass, or the like.

The irradiated member 22 is for diffusing the image light Li reflected by the reflection mirror 31 toward the outside of the image display apparatus 1. The irradiated member 22 is configured by, for example, a diffraction optical element, and specifically is configured by a holographic optical element (HOE: Holographic Optical Element). The HOE is an optical element that selectively diffracts only a certain wavelength in accordance with an incidence angle and transmit the rest. In the present embodiment, the irradiated member 22 is configured by a transmission-type diffusion HOE. As a result, the image light Li reflected by the reflection mirror 31 and having entered the transmission-type diffusion HOE (the irradiated member 22) from an inner side of the image display apparatus 1 is diffused (scattered) in various directions and outputted toward an outer side of the image display apparatus 1. FIG. 2 schematically illustrates a state in which the image light Li (Lia and Lib) having entered the transmission-type diffusion HOE (the irradiated member 22) is diffused (scattered) and outputted toward the outer side.

It is possible to fabricate the transmission-type diffusion HOE as described above, for example, in the following manner. It is possible to fabricate the transmission-type diffusion HOE using a photopolymer (such as a photosensitive material) or a UV-curable resin. For example, as illustrated in FIG. 5A, a photopolymer X is irradiated with object light La (diffusion light) and reference light Lb, and is exposed to record an interference fringe as appropriate. At this time, the object light La is applied from a direction of about 0° (a normal direction of a first face (a face S1)) with respect to the first face (the face S1) of the photopolymer X, and the reference light Lb is applied with respect to the normal direction of the first face (the face S1) of the photopolymer X, for example, at an angle of 40°. As a result, as illustrated in FIG. 5B, the HOE is fabricated that diffracts reproduction illumination light Lc that enters at the angle of 40° that is same as the reference light Lb and an angle in the vicinity thereof with respect to the normal direction of the first face (the face S1), and outputs the reproduction light Ld from a second face (a face S2).

Note that although a volume type HOE in which the interference fringe is recorded by exposing a photosensitive material is exemplified in the above description, a surface relief type HOE in which the interference fringe is formed by a concavo-convex shape obtained from a surface of a material may be used as the irradiated member 22.

FIG. 6 illustrates diffraction characteristics of the transmission-type diffusion HOE. A vertical axis of the characteristic diagram illustrated in FIG. 6 is a diffraction efficiency (%) of the reproduction illumination light at each incidence angle θ. The diffraction efficiency is calculated on the basis of, for example, a ratio of the reproduction light Ld and the reproduction illumination light Lc (a reproduction light intensity/a reproduction illumination light intensity). Note that, in FIG. 6, diffraction efficiencies of respective pieces of color light of blue light (a wavelength: 455 nm), green light (a wavelength: 530 nm), and red light (a wavelength: 630 nm) are respectively indicated by a solid line, a dotted line, and a dashed-dotted line.

In the HOE, the diffraction efficiency becomes maximum when light having a wavelength similar to a wavelength used as the reference light Lb is used as the reproduction illumination light Lc at an incidence angle equivalent to that of the reference light Lb at the time of exposure. That is, for example, in a manufacturing process of the transmission-type diffusion HOE described above, in a case where the green light having a wavelength of about 530 nm is used as the object light La and the reference light Lb, and where the light is applied to the first face (the face S1) of the photopolymer X from a direction of the incidence angle of about 40°, the thus-obtained transmission-type diffusion HOE becomes maximum in the intensity (a luminance) of the reproduction light Ld outputted perpendicularly from the second face (the face S2) in a case where the reproduction illumination light Lc has entered the first face (the face S1) at the incidence angle of 40°. Further, as illustrated in FIG. 6, the diffraction efficiency of light having a wavelength different from that of the reference light Lb used for the exposure (for example, the red light having the wavelength of 630 nm and the blue light having the wavelength of 455 nm) becomes maximum at the incidence angle of the reference light Lb of 40°.

In this manner, it is possible to increase the luminance of the image display apparatus 1 by causing the image light Li to enter at a constant incidence angle in accordance with the incidence angle of the reference light Lb at the time of the exposure of the transmission-type diffusion HOE. Note that the incidence angle of the object light La and the reference light Lb at the time of the exposure of the transmission-type diffusion HOE is not limited to the above-described examples, and may be appropriately set in accordance with an application of the image display apparatus 1, characteristics of the transmission-type diffusion HOE, and the like. The incidence angle of the image light Li to the irradiated member 22 is preferably 40° or greater and 75° or less, for example. As a result, it is possible to ensure a size of picture to be projected on the screen.

The optical member 23 is for reflecting or diffusing 0-order light of the image light Li that is transmitted through the irradiated member 22 and becomes leakage light to reduce a leakage light amount, and is disposed downstream of the irradiated member 22 on a light path of the image light Li. The optical member 23 is configured by, for example, a diffraction optical element, and specifically, is configured by a reflection-type mirror holographic optical element. The reflection-type mirror HOE corresponds to one concrete example of a "first optical member" of the present disclosure. As a result, as illustrated in FIG. 3, 0-order light $Li_0$ of the image light Li having transmitted through the irradiated member 22 without being diffracted by the irradiated member 22 is reflected to the inner side of the image display apparatus 1 by the reflection-type mirror HOE (the optical member 23). As a result, the leakage light amount to be outputted to the outside of the image display apparatus 1 is reduced. That is, for example, the intensity of the image to be projected onto an installation plane of the image display apparatus 1 is reduced.

It should be noted that the reflection light (the 0-order light $Li_0$ of the image light Li) to be reflected by the reflection-type mirror HOE (the optical member 23) is desirably reflected at an angle that does not allow the light to reach the screen 20 on the opposite side based on the axis J11 as a reference. For example, $\theta=\tan^{-1}(h/\phi)$ holds true where a diameter of the screen 20 is $\phi$, a height in the Y-axis direction of the screen 20 is h, and a reflection angle is $\theta$, and the reflection angle that does not allow the light to reach the screen 20 on the opposite side becomes a value greater than $\theta$.

Further, by disposing the reflection-type mirror HOE (the optical member 23) downstream of the irradiated member 22, that is, on a viewer side, external light Lo that enters at the incidence angle of the image light Li and its vicinity is reflected as illustrated in FIG. 4. As a result, the intensity of the external light Lo entering the irradiated member 22 is reduced, and diffraction light Loo of the external light Lo reflected by a back face (a face 22S2) of the irradiated member 22 to be reproduced is reduced. Accordingly, a transparency and the image quality (an image contrast) of the screen 20 are improved.

It is possible to fabricate the reflection-type mirror HOE as described above, for example, in the following manner. It is possible to fabricate the reflection-type mirror HOE using a photopolymer (such as a photosensitive material) or a UV-curable resin. For example, as illustrated in FIG. 7A, the object light La is applied from the second face (the face S2) of the photopolymer X with respect to the photopolymer X, and the reference light Lb is applied from the first face (the face S1) of the photopolymer X, respectively, at an angle of, e.g., 40° and is exposed to appropriately record the interference fringe. As a result, as illustrated in FIG. 7B, the HOE is fabricated that diffracts the reproduction illumination light Lc that enters at the angle of 40° that is same as the reference light Lb and an angle in the vicinity thereof with respect to the normal direction of the first face (the face S1), and reflects the reproduction light Ld at an angle of −40° with respect to the normal direction of the first face (the face S1).

FIG. 8 illustrates diffraction characteristics of the reflection-type mirror HOE. A vertical axis of the characteristic diagram illustrated in FIG. 8 is a diffraction efficiency (%) of the reproduction illumination light at each incidence angle $\theta$. The diffraction efficiency is calculated on the basis of, for example, a ratio of the reproduction light Ld and the reproduction illumination light Lc (the reproduction light intensity/the reproduction illumination light intensity). Note that, in FIG. 8, diffraction efficiencies of respective pieces of color light of the blue light (the wavelength: 455 nm), the green light (the wavelength: 530 nm), and the red light (the wavelength: 630 nm) are respectively indicated by a solid line, a dotted line, and a dashed-dotted line.

The transmission-type diffusion HOE illustrated in FIG. 6 has, for example, a diffraction efficiency of about 50% with respect to the reproduction illumination light having a wavelength of 530 nm and at the incidence angle of 40°. The reflection-type mirror HOE illustrated in FIG. 8 has, for example, the diffraction efficiency of about 80% with respect to the reproduction illumination light having the wavelength of 530 nm and at the incidence angle of 40°. Accordingly, as with the present embodiment, by combining the transmission-type diffusion HOE (the irradiated member 22) and the reflection-type mirror HOE (the optical member 23) in the screen 20, the leakage light (the 0-order light $Li_0$ of the image light Li) amount transmitted through the screen 20 becomes the product (0.1) of a transmission light amount of 0.5 of the transmission-type diffusion HOE and a transmission light amount of 0.2 of the reflection-type mirror HOE. That is, for example, the intensity is reduced to 1/5 as compared with the leakage light amount (0.5) in a case where the screen is configured by the supporting member 21 and the transmission-type diffusion HOE (the irradiated member 22).

Although a configuration of the screen 20 has been described above, the screen 20 of the present embodiment is not limited to a layer structure of the supporting member 21, the irradiated member 22, and the optical member 23 illustrated in FIG. 1, and it is possible to employ the following configuration as well. As described above, in the screen 20 of the present embodiment, the optical member 23 may be disposed downstream of the irradiated member 22 on the light path of the image light Li. Accordingly, for example, as with an image display apparatus 1A illustrated in FIG. 9, the irradiated member 22 and the optical member 23 may be disposed on the outer side of the supporting member 21 in this order. By disposing the irradiated member 22 and the optical member 23 on the outer side of the supporting member 21 in order in this manner, the 0-order light $Li_0$ of the image light Li having transmitted through the supporting member 21 and the irradiated member 22 is reflected toward the inner side of the image display apparatus 1 by the optical member 23 as illustrated in FIG. 10. Accordingly, the leakage light amount to be outputted to the outside of the image display apparatus 1 is reduced. Further, in the screen 20 of the present embodiment, as with an image display apparatus 1B illustrated in FIG. 11, the irradiated member 22 may be disposed on the inner side and the optical member 23 may be disposed on the outer side with the supporting member 21 being disposed inbetween.

In addition, although an example has been described in the present embodiment in which the screen 20 is configured using three members of the supporting member 21, the irradiated member 22, and the optical member 23, for example, the supporting member 21 may also serve as the irradiated member 22, or the supporting member 21 may also serve as the optical member 23. Thus, the number of components of the screen 20 is reduced. Further, for example, it is possible to reduce an attachment process or the like of the irradiated member 22 and the optical member 23 to the supporting member 21.

The top plate 30 is for holding the reflection mirror 31, and is disposed above the image display apparatus 1, for example.

The reflection mirror 31 has a reflection face (a face 31S) that reflects the image light Li outputted from the output section 11, and is for controlling the incidence angle, with respect to the screen 20, of the image light Li outputted from the output section 11. Specifically, the reflection mirror 31 is for controlling the incidence angle of the image light Li with respect to the screen 20 to be substantially constant. It should be noted that the substantially constant incidence angle includes the incidence angle in an angle range (an allowable angle range) in which it is possible to properly execute displaying of images. The allowable angle range is set, for example, in accordance with the diffraction characteristics of the transmission-type diffusion HOE constituting the irradiated member 22. As a result, the image light Li outputted radially from the output section 11 is outputted toward the screen 20 as substantially parallel light. The reflection mirror 31 corresponds to one concrete example of a "second optical member" of the present disclosure.

The reflection mirror 31 has a reflection face (a face 31S) having a rotation symmetrical shape with respect to the axis J11 as a reference, and is disposed to face the output section 11 with respect to the axis J11 as a reference so that the reflection face (the face 31S) faces the output section 11. As one example, the reflection mirror 31 has a rotation face, as the reflection face (the face 31S), formed by rotating, with respect to the axis J11 as a reference, a curved line in which a portion of a parabola is cut out. The rotation face is configured, for example, such that a side (a focal side of the parabola) that is concave in the normal line is a side (the reflection face (the face 31S)) that reflects the light, and such that an axis of the parabola and the axis J11 differ from each other. Further, the reflection surface face (the face 31S) has a shape having a vertex on the axis J11. That is, the reflection face (the face 31S) is convex when viewed from the output section 11 at a point where the rotation face described above and the axis J11 intersect with each other. Further, a cross-sectional shape of the reflection mirror 31 has a parabola shape in which the left and right shapes sandwiching the axis J11 are concave when viewed from the output section 11.

Examples of a material constituting the reflection mirror 31 include a resin such as acrylic, glass, and a metal. The reflection mirror 31 is configured, for example, by performing a mirror processing on a surface of the material described above such that a surface roughness of Ra<about 0.1 μm is obtained. Further, the reflection face (the face 31S) of the reflection mirror 31 may be subjected to a high reflectivity coating with aluminum (Al), silver (Ag), or the like. As a result, it impossible to reflect the image light Li entering the reflection face (the face 31S) highly efficiently. Further, a protective coating using a silicon oxide ($SiO_2$) film, a polymerized film, or the like may be applied to the surface of the reflection face (the face 31S).

Note that the material constituting the reflection mirror 31 is not limited to the above-described material, and it is possible to use any material depending on a processing accuracy, productivity, and the like. Further, the materials of the high reflectivity coating and the protective coating are not particularly limited.

1-2. Operation of Image Display Apparatus

In the image display apparatus 1, the image light Li outputted radially from the output section 11 along the axis J11 is reflected radially toward the entire circumference of the screen 20 by the reflection face 31S of the reflection mirror 31, and enters the screen 20 at a substantially constant incidence angle. The image light Li having entered the screen 20 is diffracted by the irradiated member 22 and is diffused to the outer side of the image display apparatus 1 to be outputted. As a result, a picture such as an all-around image is displayed on the outer side of the screen 20. Further, the 0-order light $Li_0$ of the image light Li having transmitted through the irradiated member 22 without being diffracted by the irradiated member 22 is reflected by the optical member 23 to the inner side of the image display apparatus 1.

1-3. Workings and Effects

In the image display apparatus 1 of the present embodiment, the optical member 23 is disposed downstream of the irradiated member 22 on the light path of the image light Li outputted radially from the output section 11 along the axis J11. As a result, the 0-order light $Li_0$ of the image light Li having transmitted through the irradiated member 22, which serves as the leakage light, is reflected by the optical member 23 to the inner side of the image display apparatus 1, and the leakage light amount is reduced.

In an image display apparatus of displaying an image on an all-around screen or the like as described above, a portion of image light having transmitted through the all-around screen becomes leakage light and is projected onto a table surface or the like on which the image display apparatus is placed, thereby decreasing merchantability of the image display apparatus. The leakage light is due to a limitation of a diffraction efficiency of a transmission-type hologram constituting the all-around screen, and the 0-order light of the image light having transmitted through the transmission-type hologram without being diffracted by the transmission-type hologram becomes the leakage light.

In contrast, in the image display apparatus 1 of the present embodiment, the optical member 23 is disposed downstream of the irradiated member 22 on the light path of the image light Li as described above. As a result, the 0-order light $Li_0$ of the image light Li having transmitted through the irradiated member 22 without being diffracted by the irradiated member 22 is reflected to the inner side of the image display apparatus 1 by the optical member 23 as illustrated in FIG. 3. That is, the leakage light amount is reduced, and the intensity of the 0-order light $Li_0$ of the image light Li to be projected onto the table surface or the like is reduced. Accordingly, it is possible to reduce a noise that causes a decrease in merchantability.

Further, in the present embodiment, it is disposed downstream of the irradiated member 22, that is, on a viewer side. Thus, as illustrated in FIG. 4, the external light Lo that enters at the incidence angle of the image light Li and its vicinity is reflected. This reduces the intensity of the external light Lo entering the irradiated member 22, and reduces the diffraction light of the external light Lo reflected by the back face (the face 22S2) of the irradiated member 22 to be reproduced. Accordingly, it is possible to improve the transparency and the image quality (the image contrast) of the screen 20.

Further, by disposing the irradiated member 22 and the optical member 23 on the inner side of the supporting member 21 as with the image display apparatus 1 illustrated in FIG. 1, the irradiated member 22 and the optical member 23 are protected from the outside by the supporting member 21. Hence, it is possible to increase reliability.

Further, by disposing the irradiated member 22 and the optical member 23 on the outer side of the supporting member 21 as with the image display apparatus 1A illustrated in FIG. 9, it is possible to simplify the attachment process of the irradiated member 22 and the optical member 23 to the supporting member 21.

Furthermore, by adding the characteristics as the irradiated member 22 to the supporting member 21 or the characteristics as the optical member 23 to the supporting member 21, and configuring the screen 20 by two members of the supporting member 21 and the irradiated member 22 or the supporting member 21 and the optical member 23, it is possible to reduce the number of components and to reduce the attachment process of the irradiated member 22 and the optical member 23 to the supporting member 21. Hence, it is possible to reduce the costs.

Next, second to fourth embodiments and modification examples 1 to 4 of the present disclosure will be described. Hereinafter, the similar components to those of the embodiment described above are denoted by the same reference numerals, and description thereof is omitted as appropriate.

2. Second Embodiment

FIG. 12 schematically illustrates one example of a cross-sectional configuration of an image display apparatus (an image display apparatus 2) according to the second embodiment of the present disclosure. In the image display apparatus 2, for example, it is possible to display a picture on the all-around screen having the rotary body shape as with the first embodiment described above. The image display apparatus 2 of the present embodiment differs from the first embodiment described above, in that the image display apparatus 2 has a screen 40 configured by the supporting member 21, the irradiated member 22, and an optical member 43, and in that the optical member 43 is configured by a transmission-type diffusion holographic optical element.

The optical member 43 is for diffusing the 0-order light of the image light Li that is transmitted through the irradiated member 22 and becomes the leakage light to reduce the leakage light amount, and is disposed downstream of the irradiated member 22 on the light path of the image light Li. The optical member 43 of the present embodiment is configured by the transmission-type diffusion HOE. The transmission-type diffusion HOE corresponds to one concrete example of the "first optical member" of the present disclosure. Thus, as illustrated in FIG. 13, the 0-order light $Li_0$ of the image light Li having transmitted through the irradiated member 22 without being diffracted by the irradiated member 22 is diffracted by the transmission-type diffusion HOE (the optical member 43) and is diffused (scattered) in various directions to be outputted toward the outer side of the image display apparatus 2. As a result, the leakage light amount to be outputted to the outside of the image display apparatus 1 is reduced. That is, for example, the intensity of the image to be projected onto the installation plane of the image display apparatus 1 is reduced.

It is possible to fabricate the transmission-type diffusion HOE constituting the optical member 43 by using, for example, a method similar to that of the transmission-type diffusion HOE constituting the irradiated member 22 described above.

The screen 40 of the present embodiment is not limited to a layer structure of the supporting member 21, the irradiated member 22, and the optical member 23 illustrated in FIG. 12 as with the first embodiment described above, and it is possible to employ the following configuration as well. For example, as with an image display apparatus 2A illustrated in FIG. 14, the irradiated member 22 and the optical member 43 may be disposed on the outer side of the supporting member 21 in this order. Further, as with an image display apparatus 2B illustrated in FIG. 15, the irradiated member 22 and the optical member 43 may be disposed such that the irradiated member 22 is disposed on the inner side and the optical member 43 is disposed on the outer side with the supporting member 21 being disposed inbetween. Thus, it is possible to obtain an effect similar to that described in the first embodiment described above.

As described above, in the present embodiment, the optical member 43 configured by the transmission-type diffusion HOE is disposed downstream of the irradiated member 22 on the light path of the image light Li. Thus, the 0-order light $Li_0$ of the image light Li having transmitted through the irradiated member 22 without being diffracted by the irradiated member 22 is diffused (scattered) toward the outer side of the image display apparatus 2 by the optical member 43 as illustrated in FIG. 13. Accordingly, as with the first embodiment described above, it is possible to reduce the leakage light amount and to reduce the noise that causes a decrease in merchantability.

Further, in the present embodiment, as described above, the 0-order light $Li_0$ of the image light Li having transmitted through the irradiated member 22 without being diffracted by the irradiated member 22 is diffused (scattered) toward the outer side of the image display apparatus 2 by the optical member 43. The 0-order light $Li_0$ of the image light Li diffused (scattered) toward the outer side of the image display apparatus 2 serves as the reproduction light. Accordingly, it is possible to increase the utilization efficiency of the image light Li as the reproduction light and to increase the luminance of the image display apparatus 2.

3. Third Embodiment

FIG. 16 schematically illustrates one example of a cross-sectional configuration of an image display apparatus (an image display apparatus 3) according to the third embodiment of the present disclosure. In the image display apparatus 3, for example, it is possible to display a picture on the all-around screen having the rotary body shape as with the first embodiment described above. The image display apparatus 3 of the present embodiment differs from the first embodiment described above, in that the image display apparatus 3 has a screen 50 configured by the supporting member 21, the irradiated member 22, and an optical member 53, and in that the optical member 53 is configured by a reflection-type diffusion holographic optical element.

The optical member 53 is for reflecting the 0-order light of the image light Li that is transmitted through the irradiated member 22 and becomes the leakage light to reduce the leakage light amount, and is disposed downstream of the irradiated member 22 on the light path of the image light Li. The optical member 53 of the present embodiment is configured by the reflection-type diffusion HOE. The reflection-type diffusion HOE corresponds to one concrete example of the "first optical member" of the present disclosure. Thus, the 0-order light of the image light Li having transmitted through the irradiated member 22 without being diffracted by the irradiated member 22 is diffused (scattered) in various directions by the reflection-type diffusion HOE (the optical member 53) to be reflected toward the inner side of the image display apparatus 3.

It is possible to fabricate the reflection-type diffusion HOE configuring the optical member 53, for example, in the following manner. It is possible to fabricate the reflection-type diffusion HOE using a photopolymer (such as a photosensitive material) or a UV-curable resin. For example, as illustrated in FIG. 17A, the object light (the diffusion light) La is applied from the second face (the face S2) of the photopolymer X with respect to the photopolymer X, and the reference light Lb is applied from the first face (the face S1) of the photopolymer X, respectively, at an angle of, e.g., 40° and is exposed to appropriately record the interference fringe. As a result, as illustrated in FIG. 17B, the HOE is fabricated that diffracts the reproduction illumination light Lc that enters at the angle of 40° that is same as the reference light Lb and an angle in the vicinity thereof with respect to the normal direction of the first face (the face S1), and reflects the reproduction light (the diffusion light) Ld at an angle of −40° with respect to the normal direction of the first face (the face S1).

The screen 50 of the present embodiment is not limited to a layer structure of the supporting member 21, the irradiated member 22, and the optical member 23 illustrated in FIG. 16 as with the first embodiment described above, and it is possible to employ the following configuration as well. For example, as with an image display apparatus 3A illustrated in FIG. 18, the irradiated member 22 and the optical member 53 may be disposed on the outer side of the supporting member 21 in this order. Further, as with an image display apparatus 3B illustrated in FIG. 19, the irradiated member 22 and the optical member 53 may be disposed such that the irradiated member 22 is disposed on the inner side and the optical member 53 is disposed on the outer side with the supporting member 21 being disposed inbetween. Thus, it is possible to obtain an effect similar to that described in the first embodiment described above.

As described above, in the present embodiment, the optical member 53 configured by the reflection-type diffusion HOE is disposed downstream of the irradiated member 22 on the light path of the image light Li. Thus, the 0-order light $Li_0$ of the image light Li having transmitted through the irradiated member 22 without being diffracted by the irradiated member 22 is diffused (scattered) toward the inner side of the image display apparatus 3 by the optical member 53. Accordingly, as with the first embodiment described above, it is possible to reduce the leakage light amount and to reduce the noise that causes a decrease in merchantability.

4. Fourth Embodiment

FIG. 20 schematically illustrates one example of a cross-sectional configuration of an image display apparatus (an image display apparatus 4) according to the fourth embodiment of the present disclosure. In the image display apparatus 4, for example, it is possible to display a picture on the all-around screen having the rotary body shape as with the first embodiment described above. The image display apparatus 4 of the present embodiment differs from the first embodiment described above, in that the image display apparatus 4 has a screen 60 configured by the supporting member 21, an irradiated member 62, and the optical member 23, and in that the irradiated member 62 is configured by the reflection-type diffusion holographic optical element.

The irradiated member 62 diffuses (scatters) the image light Li reflected by the reflection mirror 31 toward the inner side of the image display apparatus 1. The irradiated member 62 of the present embodiment is configured by the reflection-type diffusion HOE. As a result, the image light Li reflected by the reflection mirror 31 and entered the reflection-type diffusion HOE (the irradiated member 62) from the inner side of the image display apparatus 1 is diffused (scattered) in various directions by the reflection-type diffusion HOE (the irradiated member 62) to be outputted toward the inner side of the image display apparatus 1.

It should be noted that FIG. 20 schematically illustrates a state in which the image light Li having entered the reflection-type diffusion HOE (the irradiated member 62) is diffused (scattered) to be outputted toward the inner side. In the first to the third embodiments described above, an image is displayed on a surface of the screen 60, whereas in the present embodiment, an image is displayed at a position recessed from the surface of the screen 60. This creates a floating feel of a picture.

It is possible to fabricate the reflection-type diffusion HOE constituting the irradiated member 62 by using a method similar to that of the reflection-type diffusion HOE constituting the optical member 53 described above.

The screen 60 of the present embodiment is not limited to a layer structure of the supporting member 21, the irradiated member 62, and the optical member 23 illustrated in FIG. 20 as with the first embodiment described above, and it is possible to employ the following configuration as well. For example, as with an image display apparatus 4A illustrated in FIG. 21, the irradiated member 62 and the optical member 23 may be disposed on the outer side of the supporting member 21 in this order. Further, as with an image display apparatus 4B illustrated in FIG. 22, the irradiated member 62 and the optical member 23 may be disposed such that the irradiated member 62 is disposed on the inner side and the optical member 23 is disposed on the outer side with the supporting member 21 being disposed inbetween. Thus, it is possible to obtain an effect similar to that described in the first embodiment described above.

As described above, in the image display apparatus 4 of the present embodiment, the reflection-type diffusion HOE is used as the irradiated member 62 and the optical member 23 configured by the transmission-type diffusion HOE is disposed downstream thereof. Thus, as with the first embodiment described above, it is possible to reduce the leakage light amount and to reduce the noise that causes a decrease in merchantability.

In addition, even in a case where the irradiated member 62 configured by the reflection-type diffusion HOE is combined with the optical member configured by the following HOE, it is possible to reduce the leakage light amount and to reduce the noise that causes a decrease in merchantability as with the first embodiment described above.

In an image display apparatus 5 illustrated in FIG. 23, the screen 60 is configured by the supporting member 21, the irradiated member 62 configured by the reflection-type diffusion HOE, and the optical member 53 configured by the reflection-type diffusion HOE. With the above configuration, the 0-order light $Li_0$ of the image light Li having transmitted through the irradiated member 62 without being diffracted by the irradiated member 62 is diffused (scattered) toward the inner side of the image display apparatus 5 in the optical member 53, making it possible to reduce the leakage light amount and to reduce the noise that causes a decrease in merchantability as with the first embodiment described above. Further, a layer structure of the supporting member 21, the irradiated member 62, and the optical member 53 is not limited to the screen 60 illustrated in FIG. 23, and it is possible to employ the following configuration as well. For example, as with an image display apparatus 5A illustrated in FIG. 24, the irradiated member 62 and the optical member 53 may be disposed on the outer side of the supporting member 21 in this order. Further, as with an image display apparatus 5B illustrated in FIG. 25, the irradiated member 62 and the optical member 53 may be disposed such that the irradiated member 62 is disposed on the inner side and the optical member 23 is disposed on the outer side with the supporting member 21 being disposed inbetween.

In an image display apparatus 6 illustrated in FIG. 26, the screen 60 is configured by the supporting member 21, the irradiated member 62 configured by the reflection-type diffusion HOE, and the optical member 43 configured by the transmission-type diffusion HOE. With the above configuration, the 0-order light $Li_0$ of the image light Li having transmitted through the irradiated member 62 without being diffracted by the irradiated member 62 is diffused (scattered) toward the outer side of the image display apparatus 3 in the optical member 43, making it possible to reduce the leakage light amount and to reduce the noise that causes a decrease in merchantability as with the first embodiment described above. Further, a layer structure of the supporting member 21, the irradiated member 62, and the optical member 43 is not limited to the screen 60 illustrated in FIG. 26, and it is possible to employ the following configuration as well. For example, as with an image display apparatus 6A illustrated in FIG. 27, the irradiated member 62 and the optical member 43 may be disposed on the outer side of the supporting member 21 in this order. Further, as with an image display apparatus 6B illustrated in FIG. 28, the irradiated member 62 and the optical member 43 may be disposed such that the irradiated member 62 is disposed on the inner side and the optical member 23 is disposed on the outer side with the supporting member 21 being disposed inbetween.

5. Modification Examples 5-1. Modification Example 1

In the first to the fourth embodiment described above, an example is described as one concrete example of the second optical member in which the reflection mirror 31 is used having the reflection face (the face 31S) having the rotation symmetrical convex shape with respect to the axis J11 as a reference. However, a shape of the reflection mirror 31 is not limited thereto. For example, a reflection mirror may be used in which the center of the reflection face 31S of the reflection mirror 31 (an intersection point with the axis 11S) has a concave shape when viewed from the output section 11. Alternatively, a reflection mirror having a flat reflection face may be used.

5-2. Modification Example 2

FIG. 29 schematically illustrates one example of a cross-sectional configuration of an image display apparatus (an image display apparatus 7) according to modification example 2 of the present disclosure. In the image display apparatus 7, for example, it is possible to display a picture on the all-around screen having the rotary body shape as with the first embodiment described above. The image display apparatus 7 of the present modification example differs from the first embodiment described above, in that a reflection reducing film 71 is further disposed on the inner side of the screen 20 configured by the supporting member 21, the irradiated member 22, and the optical member 23.

The reflection reducing film 71 is for reducing the diffraction intensity of the external light Lo by the transmission-type diffusion HOE that constitutes the irradiated member 22, and is, for example, attached to an innermost surface of the screen 20 as illustrated in FIG. 29. The reflection reducing film 71 may have a characteristic that allows a reflectivity of the external light Lo in the vicinity of the incidence angle of the image light Li to be low, and for example, it is possible to use an antireflection film having a single layer or multiple layer structure, a moth-eye film, or the like.

As described above, in the present modification example, the reflection reducing film 71 is disposed on the innermost surface of the screen 20. Thus, for example, the diffraction intensity of the external light Lo due to the transmission-type diffusion HOE constituting the irradiated member 22 is reduced. Accordingly, it is possible to increase the transparency of the screen 20 and to further improve the image quality (contrast), in addition to the effects of the first embodiment described above.

It should be noted that the reflection reducing film 71 does not necessarily have to be provided on the innermost surface of the screen 20, and may be disposed on the outer side of the screen 20 as illustrated in FIG. 30, for example. By providing the reflection reducing film 71 on the outer side of the screen 20, a surface reflection of the external light Lo at a surface of the screen 20 is reduced and the transparency of the screen 20 is increased. Further, at this time, it is possible to increase the luminance as a result of an increase in transmissivity of the image light Li in a case where the irradiated member 22 is configured by the transmission-type diffusion HOE.

Further, although the present modification example has been described on the basis of the screen 20 of the first embodiment, it is also possible to apply the reflection reducing film 71 to the screens 40, 50, and 60 of the second to the fourth embodiments described above. In any of these cases, it is possible to increase the transparency of the screens 40, 50, and 60 and to further improve the image quality (contrast) as described above.

Further, in the present modification example, although an example has been described in which the reflection reducing film 71 is provided on the inner side (FIG. 29) or the outer side (FIG. 30) of the screen 20, the reflection reducing film 71 may be provided on both the inner side and the outer side of the screen 20.

5-3. Modification Example 3

FIG. 31 schematically illustrates one example of a cross-sectional configuration of an image display apparatus (an image display apparatus 8) according to modification example 3 of the present disclosure. In the image display apparatus 8, for example, it is possible to display a picture on the all-around screen having the rotary body shape as with the first embodiment described above. The image display apparatus 8 of the present modification example differs from the first embodiment, etc., described above, in that a reflection mirror 81 is disposed below the image display apparatus 8 on the inner side of the screen 20 configured by the supporting member 21, the irradiated member 22, and the optical member 23.

In the present modification example, the output section 11 is disposed downward, for example, above a position of substantially the center of the image display apparatus 8. Although not illustrated, the output section 11 is held at a position away from the base 10 by, for example, a jig or the like coupled to an upper part (the top plate 30) of the image display apparatus 8. As with the first embodiment, the screen 20 is disposed above the base 10 with respect to an optical axis (the axis J11) of the image light Li to be outputted from the output section 11 as a reference. The reflection mirror 81 is disposed on the base 10 with respect to the axis J11 as a reference so that the reflection face (the face 31S) faces the output section 11.

The reflection mirror 81 has a reflection face (a face 81S) having a rotation symmetrical shape with respect to the axis J11 as a reference, and is disposed to face the output section 11 with respect to the axis J11 as a reference so that the reflection face (the face 81S) faces the output section 11. In the present modification example, for example, a curved line forming a cross-sectional shape of the reflection face 81S on the right side with the axis J11 interposed therebetween is formed by cutting out a portion of a parabola whose vertex faces downward, and a rotation face formed by rotating a portion (a curved line) of the cut-out parabola with respect to the axis J11 as a reference serves as the reflection face (the face 81S).

In the image display apparatus 8 of the present modification example, the image light Li is outputted downward from the output section 11 toward the reflection mirror 81. The outputted image light Li is reflected upward by the reflection face (the face 81S) and enters the screen 20 at a substantially constant incidence angle. The image light Li that has entered the screen 20 is transmitted and diffused toward the outer side of the image display apparatus 8 in the irradiated member 22. As a result, an all-around image or the like is displayed on the outer side of the screen 20.

As described above, positions of the output section 11 and the reflection mirror 81 are not limited to those of the first embodiment described above, and it is possible to reduce the leakage light amount by disposing the optical member 23 downstream of the irradiated member 22 on the light path of the image light Li as with the first embodiment described above. That is, even in a case where the image light Li is to be outputted toward the reflection mirror 81 disposed below, the 0-order light $Li_0$ of the image light Li having transmitted through the irradiated member 22 without being diffracted by the irradiated member 22 is reflected toward the inner side of the image display apparatus 1 by the optical member 23, and the leakage light amount is reduced. Thus, it is possible to reduce the projection of an image onto the ceiling or the like (a noise) and the direct entry of the 0-order light $Li_0$ of the image light Li into viewer's eyes.

In addition, the external light Lo that enters at the incidence angle of the image light Li and its vicinity becomes reflected by the optical member 23, and it becomes possible to improve the transparency and the image quality (the image contrast) of the screen 20 as with the first embodiment described above.

Although the present modification example has been described on the basis of the screen 20 of the first embodiment, it is possible to apply a configuration of the present modification example to the screens 40, 50, and 60 of the second to the fourth embodiments described above as well.

5-4. Modification Example 4

FIGS. 32, 33, and 34 each schematically illustrate one example of a cross-sectional configuration of an image display apparatus (image display apparatuses 9A to 9C) according to modification example 4 of the present disclosure. In the image display apparatuses 9A to 9C, for example, it is possible to display a picture on the all-around screen having the rotary body shape as with the first embodiment described above. In the above-described first to fourth embodiments and the modification examples 1 and 2, the image display apparatuses 1 to 9 having the screen (e.g., the screen 20) having the cylindrical shape is illustrated, but the present technology is not limited to a shape of the screen.

For example, as with the image display apparatus 9A illustrated in FIG. 32, the screen 20 may be, for example, a half cylindrical shape having a cut plane (a face 20S) that includes the central axis (the axis J11) of the cylinder. In addition, for example, as with the image display apparatus 90B illustrated in FIG. 33, the screen 20 may have a rectangular parallelepiped shape. Further, as illustrated in FIG. 34, for example, a flat-plate-shaped screen 20 may be used, in which case the output section 11 is disposed on the back of the screen 20, for example.

Although the present disclosure has been described with reference to the first to the fourth embodiments and the modification examples 1 to 4, the present disclosure is not limited to the above-described embodiments and the like, and various modifications can be made.

In addition, although an example in which a 2D picture is displayed on the screen (e.g., the screen 20) has been described in the above embodiment and the like, it is possible to apply the present technology to an image display apparatus that allows for 3D picture displaying.

It is to be noted that the effects described herein are not necessarily limiting, and any of the effects described in the present disclosure may be provided.

It should be noted that it is possible for the present disclosure to employ the following configurations. According to the present technology of the following configuration, the first optical member is disposed downstream of the irradiated member on the light path of the projection light. Thus, a portion of the projection light having transmitted through the irradiated member is reflected or diffused, making it possible to reduce the leakage light amount. Accordingly, it is possible to reduce the noise that causes a decrease in merchantability.

(1) An image display apparatus including:
an output section that outputs projection light along a predetermined axis;
an irradiated member to be irradiated with the projection light; and
a first optical member that is disposed downstream of the irradiated member on a light path of the projection light, and reflects or diffuses a portion of the projection light that has transmitted through the irradiated member.

(2) The image display apparatus according to (1), further including a second optical member that is disposed to face the output section along the predetermined axis, and reflects or refracts the projection light to the irradiated member.

(3) The image display apparatus according to (2), in which the second optical member causes an incidence angle of the projection light to the irradiated member to be substantially constant.

(4) The image display apparatus according to (3), in which the first optical member reflects or diffuses the projection light in the vicinity of the incidence angle that has transmitted through the irradiated member.

(5) The image display apparatus according to any one of (1) to (4), in which the irradiated member includes a diffraction optical element that causes the projection light to be transmitted and diffuses the projection light.

(6) The image display apparatus according to any one of (1) to (4), in which the irradiated member includes a diffraction optical element that reflects and diffuses the projection light.

(7) The image display apparatus according to any one of (1) to (6), in which the first optical member includes a diffraction optical element that reflects and refracts the projection light that has transmitted through the irradiated member.

(8) The image display apparatus according to any one of (1) to (6), in which the first optical member includes a diffraction optical element that reflects and diffuses the projection light that has transmitted through the irradiated member.

(9) The image display apparatus according to any one of (1) to (6), in which the first optical member includes a diffraction optical element that causes the projection light that has transmitted through the irradiated member to be transmitted and diffuses the projection light that has transmitted through the irradiated member.

(10) The image display apparatus according to any one of (1) to (6), in which the first optical member includes a reflection-type mirror holographic optical element.

(11) The image display apparatus according to any one of (1) to (6), in which the first optical member includes a reflection-type diffusion holographic optical element.

(12) The image display apparatus according to any one of (1) to (6), in which the first optical member includes a transmission-type diffusion holographic optical element.

(13) The image display apparatus according to any one of (3) to (12), in which the incidence angle of the projection light with respect to the irradiated member is equal to or greater than 40° and equal to or less than 75°.

(14) The image display apparatus according to any one of (1) to (13), in which the first optical member reflects or diffuses at least a portion of 0-order light of the projection light that has transmitted through the irradiated member.

(15) The image display apparatus according to any one of (1) to (14), in which the irradiated member and the first optical member are disposed along a support base member having light permeability.

(16) The image display apparatus according to (15), in which the support base member has a cylindrical shape.

(17) A screen including:
an irradiated member to be irradiated with projection light; and
a first optical member that is disposed downstream of the irradiated member on a light path of the projection light, and reflects or diffuses a portion of the projection light that has transmitted through the irradiated member.

The present application claims the benefit of Japanese Priority Patent Application JP2019-085053 filed with the Japan Patent Office on Apr. 26, 2019, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An image display apparatus, comprising:
an output section that is configured to output projection light along a specific axis;
a supporting member that has a light permeability;
an irradiated member to be irradiated with the projection light, wherein the irradiated member is on an inner side or an outer side of the supporting member; and
a first optical member that is on a downstream of the irradiated member on a light path of the projection light and is configured to reflect or diffuse a portion of the projection light that reaches the first optical member through the irradiated member,
wherein the irradiated member, the first optical member, and the supporting member are configured to form a screen with a layer structure, and
the screen is configured to display the diffused portion of the projection light as a picture on an outer side of the screen.

2. The image display apparatus according to claim 1, further comprising a second optical member that is configured to:
face the output section along the specific axis; and
reflect or refract the projection light to the irradiated member.

3. The image display apparatus according to claim 2, wherein the second optical member causes an incidence angle of the projection light to the irradiated member to be substantially constant.

4. The image display apparatus according to claim 3, wherein an incidence angle of the diffused portion or the reflected portion of the projected light is in a vicinity of the incidence angle.

5. The image display apparatus according to claim 3, wherein the incidence angle of the projection light with respect to the irradiated member is equal to or greater than 40° and equal to or less than 75°.

6. The image display apparatus according to claim 1, wherein the irradiated member comprises a diffraction optical element that causes the projection light to be transmitted and diffuses the projection light.

7. The image display apparatus according to claim 1, wherein the irradiated member comprises a diffraction optical element that is configured to reflect and diffuse the projection light.

8. The image display apparatus according to claim 1, wherein the first optical member comprises a diffraction optical element is configured to reflect and refract the projection light that reaches the first optical member through the irradiated member.

9. The image display apparatus according to claim 1, wherein the first optical member comprises a diffraction optical element that is configured to reflect and diffuse the projection light that reaches the first optical member through the irradiated member.

10. The image display apparatus according to claim 1, wherein the first optical member comprises a diffraction optical element that is configured to:
    transmit the projection light that reaches through the irradiated member; and
    diffuse the projection light that reaches the first optical member through the irradiated member.

11. The image display apparatus according to claim 1, wherein the first optical member comprises a reflection-type mirror holographic optical element.

12. The image display apparatus according to claim 1, wherein the first optical member comprises a reflection-type diffusion holographic optical element.

13. The image display apparatus according to claim 1, wherein the first optical member comprises a transmission-type diffusion holographic optical element.

14. The image display apparatus according to claim 1, wherein the first optical member is further configured to reflect or diffuse at least a portion of 0-order light of the projection light that reaches the first optical member through the irradiated member.

15. The image display apparatus according to claim 1, wherein the supporting member has a cylindrical shape.

16. The image display apparatus according to claim 1, further comprising a partition plate and a base, wherein
    the partition plate is between the screen and the base, and
    the base is configured to hold the output section.

17. A screen, comprising:
    a supporting member that has a light permeability;
    an irradiated member to be irradiated with projection light, wherein the irradiated member is on an inner side or an outer side of the supporting member; and
    a first optical member that is on a downstream of the irradiated member on a light path of the projection light and is configured to reflect or diffuse a portion of the projection light that reaches the first optical member through the irradiated member,
    wherein the screen has a layer structure and is configured to display the diffused portion of the projection light as a picture on an outer side of the screen.

* * * * *